(12) United States Patent
Lou et al.

(10) Patent No.: US 12,003,441 B2
(45) Date of Patent: Jun. 4, 2024

(54) BACKWARD COMPATIBLE PHYSICAL LAYER CONVERGENCE PROCEDURE (PLCP) PROTOCOL DATA UNIT (PPDU) DESIGN IN WIRELESS LOCAL AREA NETWORK (WLAN) SYSTEM

(71) Applicant: INTERDIGITAL PATENT HOLDINGS, INC., Wilmington, DE (US)

(72) Inventors: Hanqing Lou, Syosset, NY (US); Li-Hsiang Sun, San Diego, CA (US); Rui Yang, Greenlawn, NY (US); Joseph S. Levy, Merrick, NY (US); Xiaofei Wang, North Caldwell, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 244 days.

(21) Appl. No.: 17/626,543

(22) PCT Filed: Jul. 10, 2020

(86) PCT No.: PCT/US2020/041633
§ 371 (c)(1),
(2) Date: Jan. 12, 2022

(87) PCT Pub. No.: WO2021/011387
PCT Pub. Date: Jan. 21, 2021

(65) Prior Publication Data
US 2022/0255693 A1    Aug. 11, 2022

Related U.S. Application Data

(60) Provisional application No. 62/873,413, filed on Jul. 12, 2019, provisional application No. 62/898,404,
(Continued)

(51) Int. Cl.
*H04L 5/00* (2006.01)
*H04W 24/10* (2009.01)

(52) U.S. Cl.
CPC ............ *H04L 5/0046* (2013.01); *H04L 5/006* (2013.01); *H04W 24/10* (2013.01)

(58) Field of Classification Search
CPC .......................... H04W 28/065; H04L 5/0044
See application file for complete search history.

(56) References Cited

U.S. PATENT DOCUMENTS 7,983,203 B2    7/2011    Kakani et al.
10,932,229 B2    2/2021    Lou et al.
(Continued)

FOREIGN PATENT DOCUMENTS

CN    103209043        7/2013
CN    103209043 B    10/2016
(Continued)

OTHER PUBLICATIONS

Azizi et al., "A PAR Proposal for Wake-up Radio," IEEE 802.11-16/1045r9 (Nov. 2016).
(Continued)

*Primary Examiner* — Zhiren Qin
(74) *Attorney, Agent, or Firm* — VOLPE KOENIG

(57) ABSTRACT

Methods and apparatuses are described herein for feedback based midamble adaptation. For example, a first station (STA) may transmit, to a second STA, a request frame that includes an indicator indicating a request for midamble information. The first STA may receive, from the second STA, a response frame that includes the midamble information determined by the second STA based on one or more channel measurements associated with the second STA. The midamble information may include a midamble report, a Doppler measurement report, or the like. The midamble
(Continued)

report or the Doppler measurement report may include at least one of a midamble periodicity, a mobility/Doppler level, or the like. Based on the midamble information, the first STA may generate a physical layer convergence procedure (PLCP) protocol data unit (PPDU) that includes at least one midamble within a data portion of the PPDU.

16 Claims, 26 Drawing Sheets

Related U.S. Application Data filed on Sep. 10, 2019, provisional application No. 62/991,974, filed on Mar. 19, 2020.

(56) References Cited

U.S. PATENT DOCUMENTS

| | | | |
|---|---|---|---|
| 11,317,436 | B2 | 4/2022 | Lou et al. |
| 2015/0181561 | A1 | 6/2015 | Oh et al. |
| 2016/0226635 | A1 | 8/2016 | Chu et al. |
| 2016/0248542 | A1 | 8/2016 | Liu et al. |
| 2017/0310424 | A1 | 10/2017 | Chun et al. |
| 2018/0145733 | A1 | 5/2018 | Verma et al. |
| 2019/0021106 | A1 | 1/2019 | Oteri et al. |
| 2020/0228634 | A1* | 7/2020 | Noh ............... H04W 74/006 |
| 2021/0336738 | A1* | 10/2021 | Nakano ........... H04W 72/0453 |
| 2022/0150676 | A1* | 5/2022 | Lim ............... H04W 28/065 |

FOREIGN PATENT DOCUMENTS

| | | |
|---|---|---|
| EP | 2752066 B1 | 9/2016 |
| EP | 3 166 270 | 5/2017 |

OTHER PUBLICATIONS

Cariou, "802.11 EHT Proposed PAR," IEEE P802.11 Wireless LANs, IEEE 802.11-18/1231r4 (Jan. 2019).
Cariou, "IEEE 802.11 EHT draft Proposed CSD," IEEE P802.11 Wireless LANs, IEEE 802.11-18/1233r4 (Jan. 2019).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Wake Up Radio Operation, IEEE P802.1ba/D3.0 (May 2019).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D3.0 (Jun. 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Sadeghi, "802.11bd Specification Framework Document," IEEE 802.11-19/0497r1 (Mar. 2019).
Sun et al., "802.11 NGV Proposed PAR," IEEE 802.11-18/0861r9 (Nov. 2018).
Sun et al., "IEEE 802.11 NGV Proposed CSD," IEEE 802.11-18/0862r3 (Sep. 2018).
Sun et al., "Preamble Design Consideration for 11be follow-up," IEEE 802.11-19/1569r1 (Nov. 2019).
Vermani et al., "Preamble Design Harmonization," IEEE 802.11-19/1021r1 (Jun. 2019).
Yang et al., "Follow-Up on PHY Signaling for Adaptive Repetition of 11p PPDU," IEEE 802.11-20/100r2 (Jan. 2020).
Yang et al., "PHY Signaling for Adaptive Repetition of 11p PPDU," IEEE 802.11-19/1596r2 (Nov. 2019).
Yang et al., "Preamble Design Consideration for 11be," IEEE 802.11-19/1214r0 (Jul. 2019).
Siemens et al., Combined event-triggered and periodic reporting, TSG-RAN Working Group 3 meeting #6, TSGR3#6 (99)956, Sophia Antipolis, France (Aug. 24-27, 1999).

\* cited by examiner

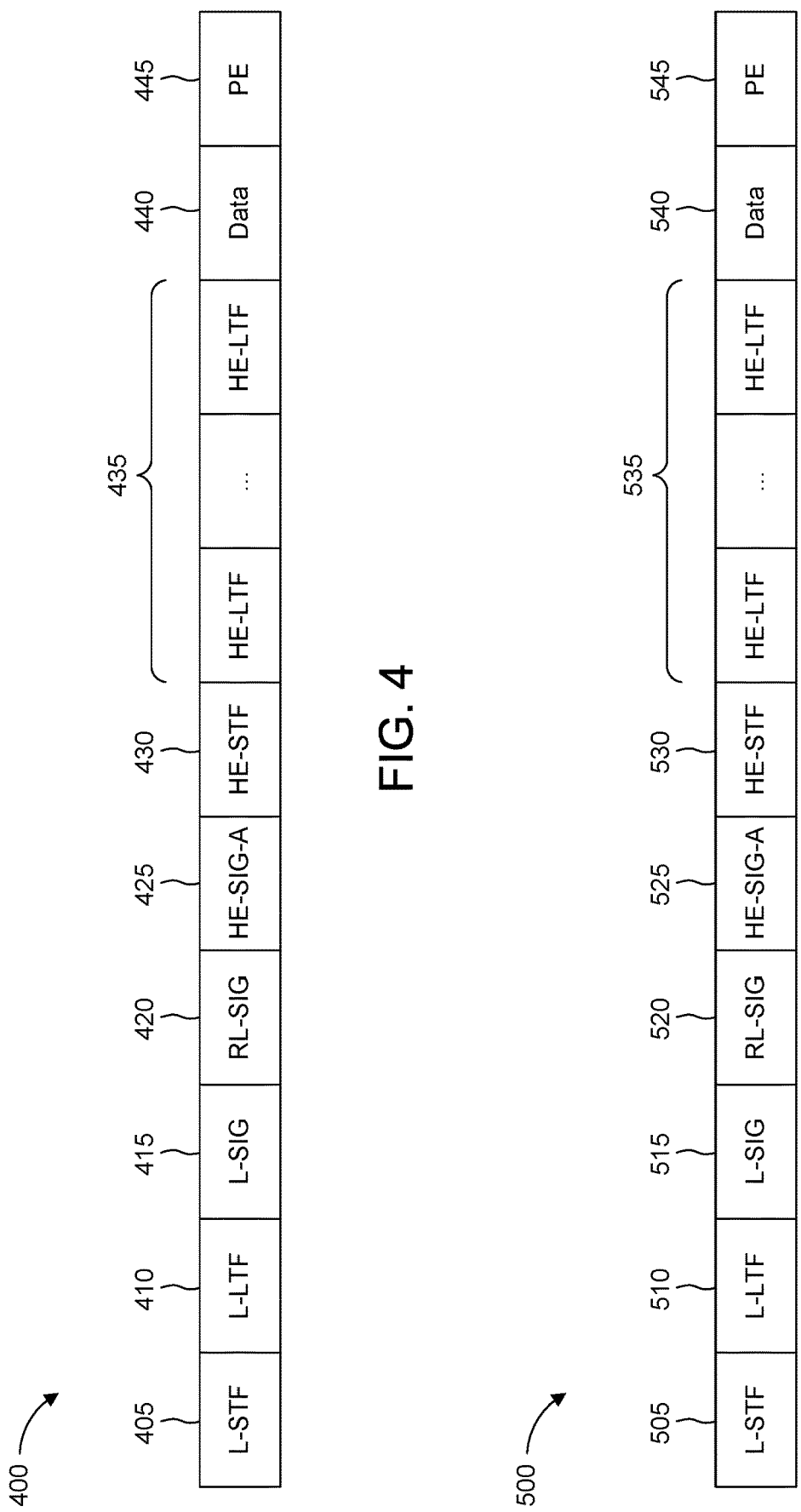

BACKWARD COMPATIBLE PHYSICAL LAYER CONVERGENCE PROCEDURE (PLCP) PROTOCOL DATA UNIT (PPDU) DESIGN IN WIRELESS LOCAL AREA NETWORK (WLAN) SYSTEM

CROSS REFERENCE TO RELATED APPLICATION

This application is the U.S. National Stage, under 35 U.S.C. § 371, of International Application No. PCT/US2020/041633 filed Jul. 10, 2020, which claims the benefit of U.S. Provisional Application No. 62/873,413, filed on Jul. 12, 2019, U.S. Provisional Application No. 62/898,404 filed Sep. 10, 2019, and U.S. Provisional Application No. 62/991,974, filed on Mar. 19, 2020, the contents of which are hereby incorporated by reference herein.

BACKGROUND

In a high mobility scenario, a midamble may be used to mitigate the high Doppler effect. For example, a midamble may enable a receiver to keep track of a time-varying channel in a high Doppler situation. However, a midamble introduces extra overhead to the receiver since it typically occupies a larger number of symbols compared to preamble. Thus, methods and apparatuses that efficiently use or adapt midamble with different periodicities are needed.

SUMMARY

Methods and apparatuses are described herein for feedback based midamble adaptation. For example, a first station (STA) may transmit, to a second STA, a request frame that includes an indicator indicating a request for midamble information. The first STA may receive, from the second STA, a response frame that includes the midamble information determined by the second STA based on one or more channel measurements associated with the second STA. The midamble information may include a midamble report, a Doppler measurement report, or the like. The midamble report or the Doppler measurement report may include at least one of a midamble periodicity, a mobility/Doppler level, a midamble frequency, a category for a midamble setting, a number of midamble required, or an indicator indicating whether the first STA needs to use a midamble. In an example, the midamble periodicity may indicate zero periodicity indicating that there is no need to use a midamble, low periodicity indicating that at least one midamble breaks a data portion of a physical layer convergence procedure (PLOP) protocol data unit (PPDU) up into a large number of OFDMA symbols, medium periodicity indicating that at least one midamble breaks a data portion of the PPDU up into a medium number of OFDMA symbols, and high periodicity indicating that at least one midamble breaks a data portion of the PPDU up into a large number of OFDMA symbols. Upon receiving the response frame, the first STA may generate, based on the midamble information, a PPDU that includes at least one midamble within a data portion of the PPDU.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 4 is a diagram illustrating an example high efficiency extended range single user physical layer convergence procedure protocol data unit (HE ER SU PPDU) format;

FIG. 5 is a diagram illustrating an example high efficiency trigger based physical layer convergence procedure protocol data unit (HE TB PPDU) format;

DETAILED DESCRIPTION

Figure 1A:
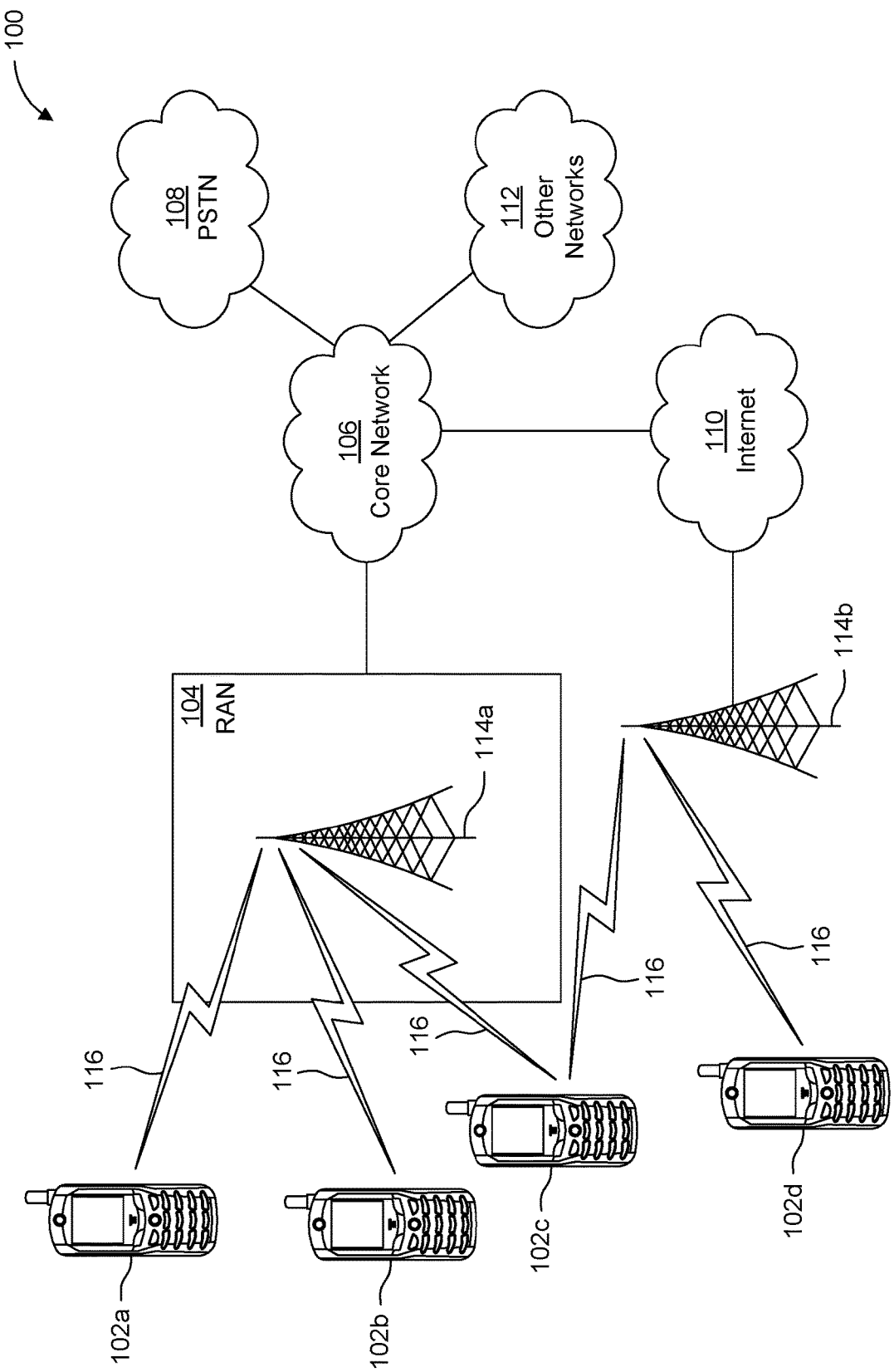
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
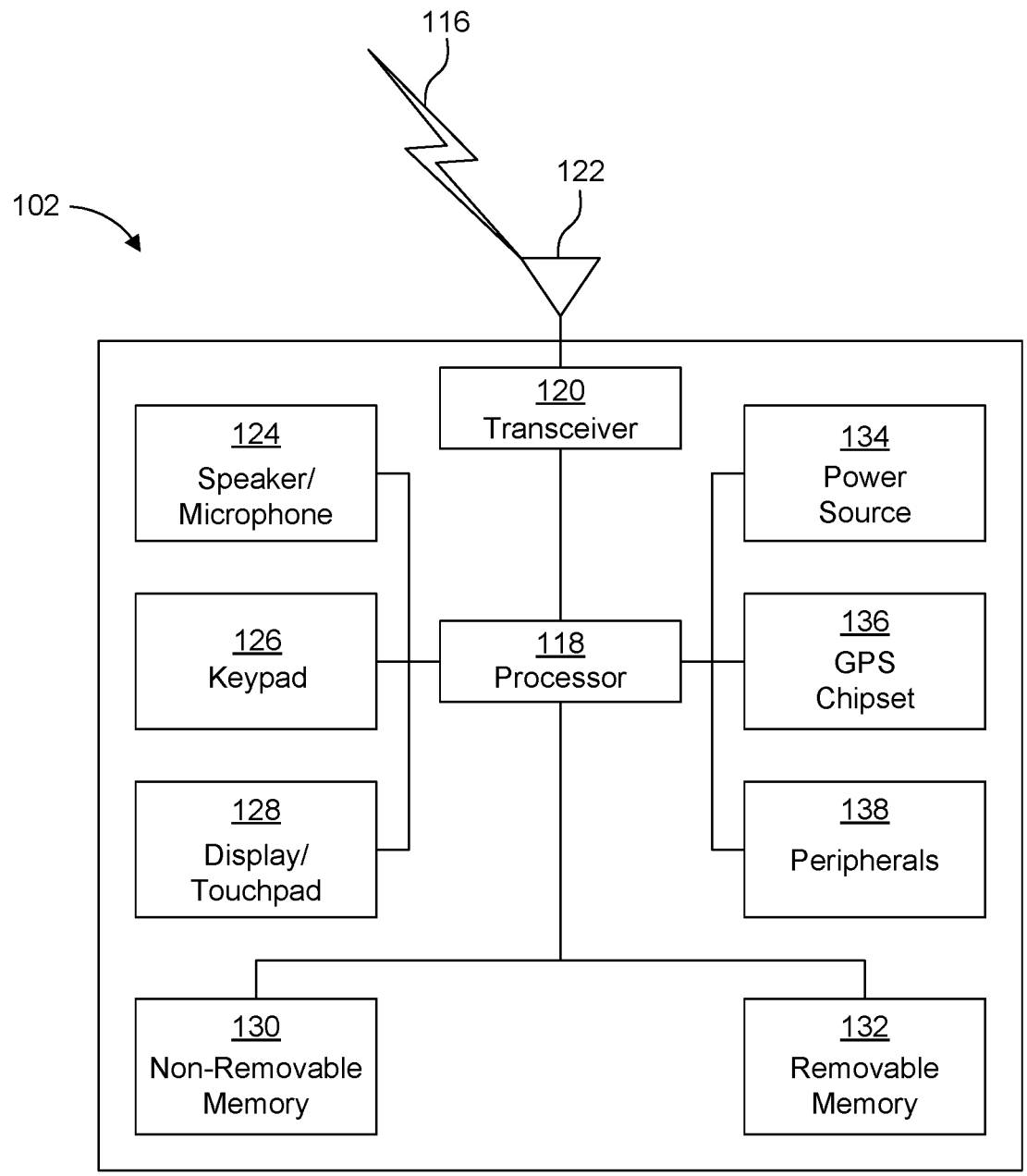
FIG. 1B is a system diagram illustrating an example wireless transmit/receive unit (WTRU) that may be used within the communications system illustrated in FIG. 1A according to an embodiment.
Figure 1C:
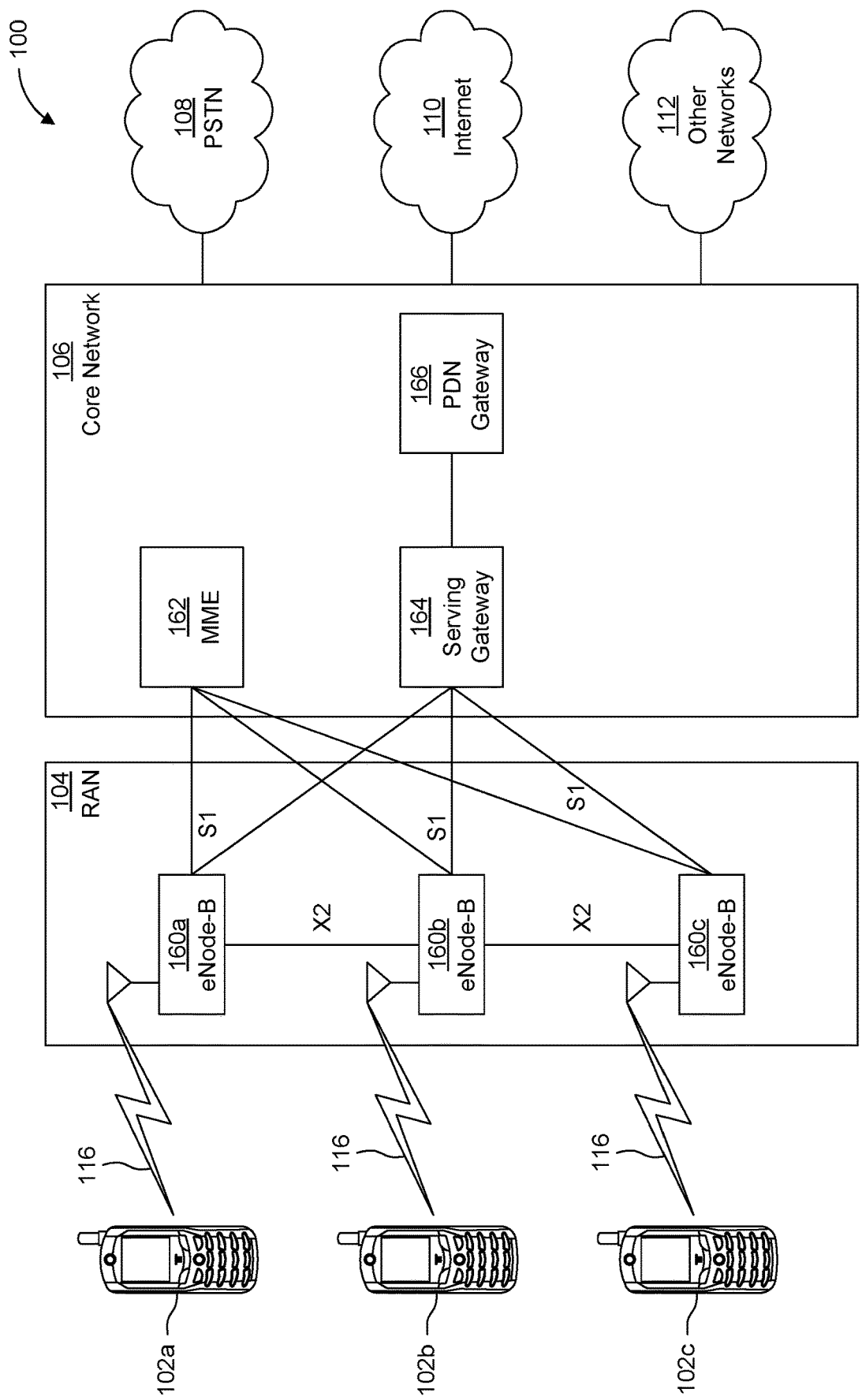
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
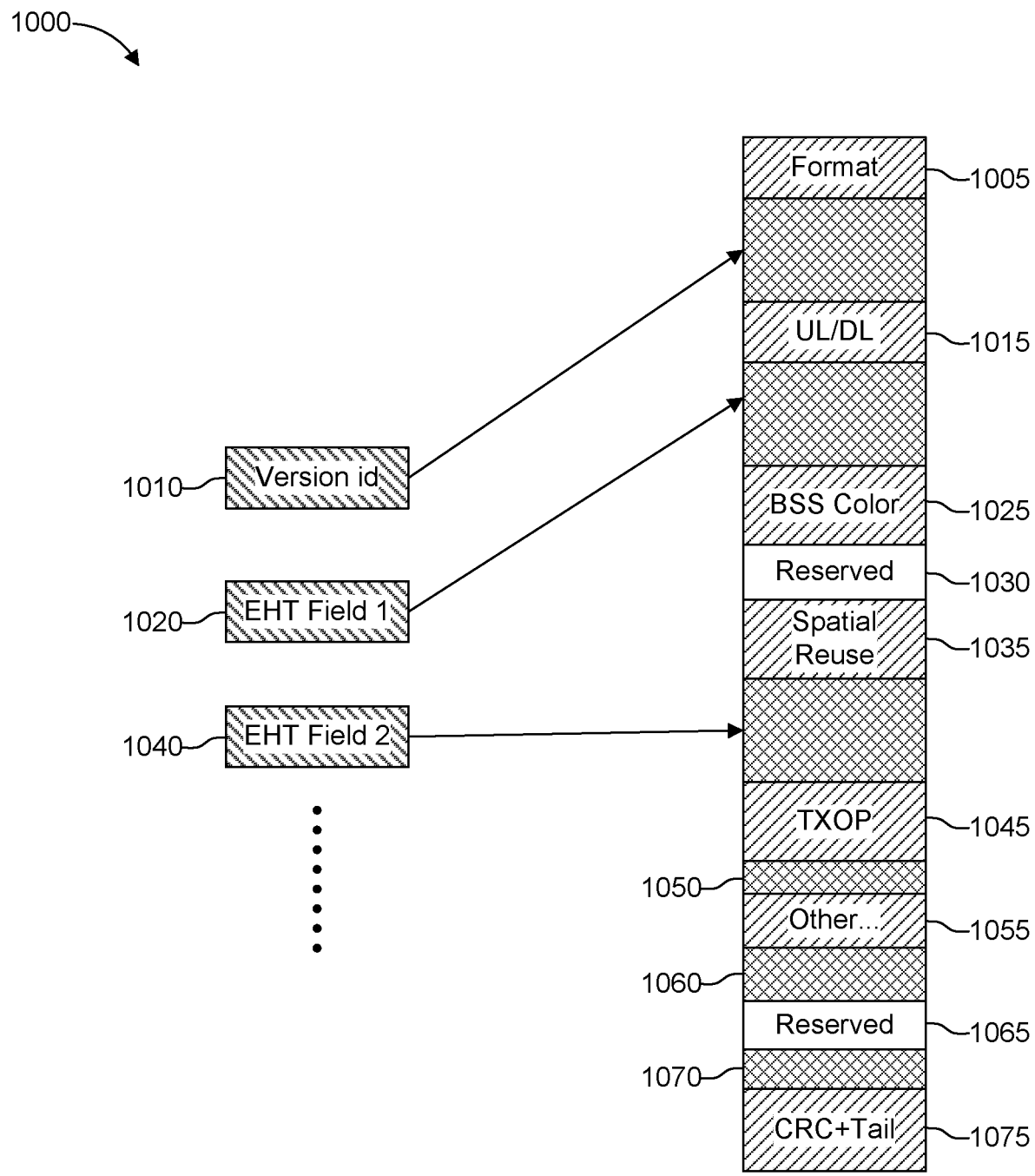
FIG. 10 is an example illustrating a legacy-friendly extremely high throughput signal (EHT SIG) field using HE-SIG-A of an HE SU PPDU.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
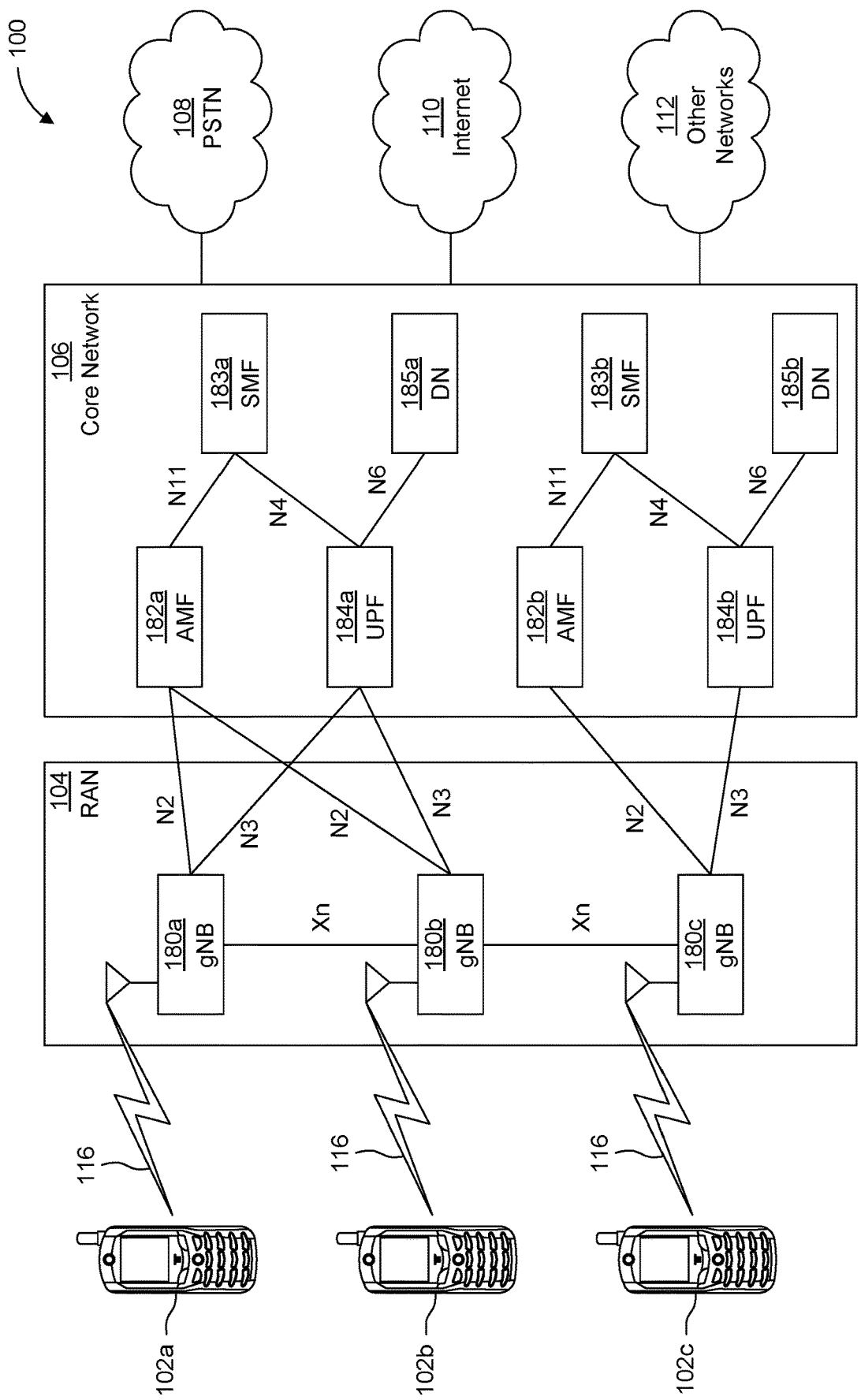
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode has an Access Point (AP) for the BSS and one or more stations (STAs) associated with the AP. The AP typically has access or interface to a Distribution System (DS) or another type of wired or wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA.

Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, will sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

To improve spectral efficiency, 802.11ac has introduced the concept for downlink Multi-User MIMO (MU-MIMO) transmission to multiple STA's in the same symbol's time frame, e.g. during a downlink OFDM symbol. The potential for the use of downlink MU-MIMO is also currently considered for 802.11ah. It is important to note that since downlink MU-MIMO, as it is used in 802.11ac, uses the same symbol timing to multiple STA's interference of the waveform transmissions to multiple STA's is not an issue. However, all STA's involved in MU-MIMO transmission with the AP must use the same channel or band, this limits the operating bandwidth to the smallest channel bandwidth that is supported by the STA's which are included in the MU-MIMO transmission with the AP.

802.11ax defines a physical layer specification and medium access control (MAC) layer specification that enables High Efficiency (HE) operation for 802.11 devices. 802.11ax is considered a next main generation of Wi-Fi after 802.11ac. 11ax defined new numerology with smaller sub-carrier spacing. DL/UL OFDMA is introduced in 11 ax to achieve better spectrum efficiency.

In IEEE 802.11ax, four physical layer convergence protocol (PLCP) protocol data unit (PPDU) formats are supported: HE single user (SU) PPDU, HE multi user (MU) PPDU, HE extended range (ER) SU PPDU, and HE trigger based (TB) PPDU.

Figure 2:
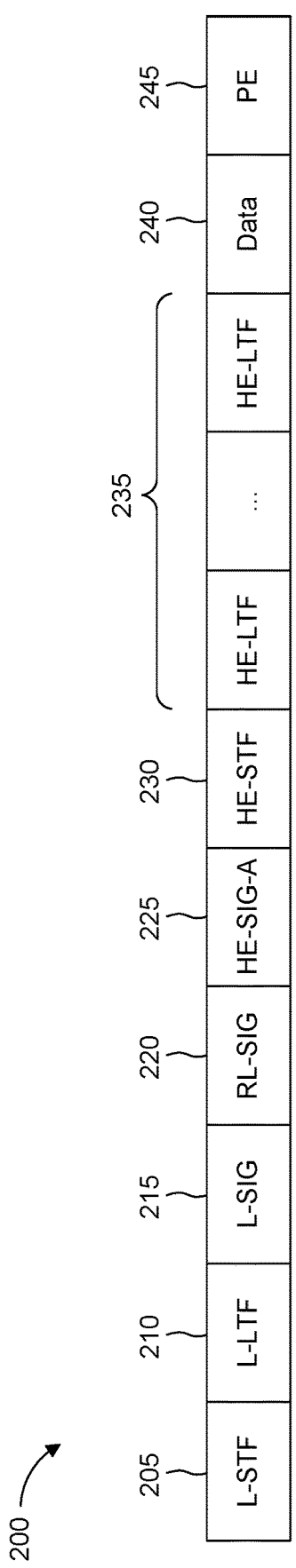
FIG. 2 is a diagram illustrating an example high efficiency single user physical layer convergence procedure protocol data unit (HE SU PPDU) format.

FIG. 2 illustrates an example high efficiency single user physical layer convergence procedure protocol data unit (HE SU PPDU) format 200, which may be used in combination of any of other embodiments described herein. The HE SU PPDU format may be used for single user transmission. As illustrated in FIG. 2, the HE SU PPDU 200 may comprise legacy short training field (L-STF) 205, legacy long training field (L-LTF) 210, legacy signal (L-SIG) 215, repeated legacy signal (RL-SIG) 220, HE-SIG-A 225, HE-STF 230, HE-LTFs 235, data 240, and packet extension (PE) field 245.

Figure 3:
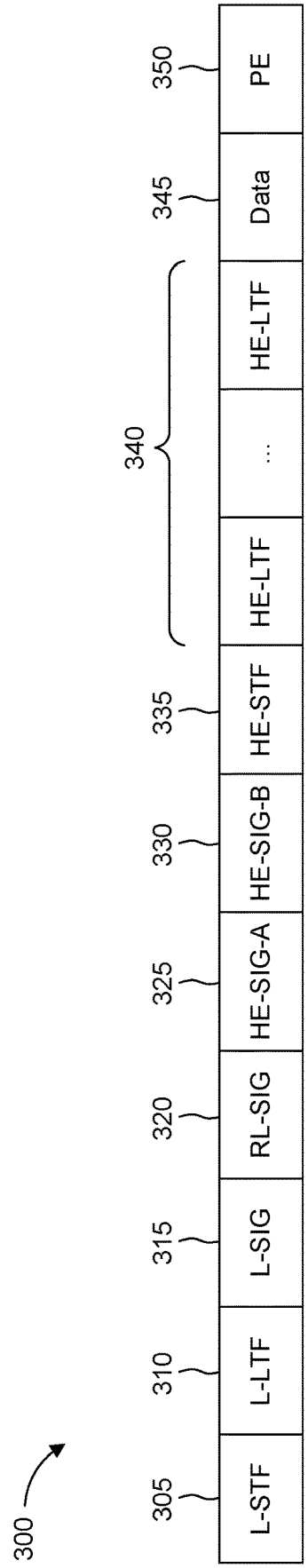
FIG. 3 is a diagram illustrating an example high efficiency multi user physical layer convergence procedure protocol data unit (HE MU PPDU) format.

FIG. 3 illustrates an example high efficiency multi user physical layer convergence procedure protocol data unit (HE MU PPDU) format 300, which may be used in combination of any of other embodiments described herein. As illustrated in FIG. 3, the HE MU PPDU 300 may comprise L-STF 305, L-LTF 310, L-SIG 315, RL-SIG 320, HE-SIG-A 325, HE- SIG-B 330, HE-STF 335, HE-LTFs 340, data 345, and PE field 350. The HE MU PPDU format 300 may be used for transmission to one or more users if the PPDU is not a response to a trigger frame. The HE-SIG-B field 330 is included in this PPDU format 300.

FIG. 4 illustrates an example high efficiency extended range single user physical layer convergence procedure protocol data unit (HE ER SU PPDU) format 400, which may be used in combination of any of other embodiments described herein. As illustrated in FIG. 4, the HE ER SU PPDU 400 may comprise L-STF 405, L-LTF 410, L-SIG 415, RL-SIG 420, HE-SIG-A 425, HE-STF 430, HE-LTFs 435, data 440, and PE field 445. The HE ER SU PPDU format 400 may be used for SU transmission with extended range. In this format, the HE-SIG-A field 425 is twice as long as the HE-SIG-A field in other HE PPDU.

FIG. 5 illustrates an example high efficiency trigger based physical layer convergence procedure protocol data unit (HE TB PPDU) format 500, which may be used in combination of any of other embodiments described herein. As illustrated in FIG. 5, the HE TB PPDU 500 may comprise L-STF 505, L-LTF 510, L-SIG 515, RL-SIG 520, HE-SIG-A 525, HE-STF 530, HE-LTFs 535, data 540, and PE field 545. The HE TB PPDU format 500 may be used for a transmission that is a response to the trigger frame or a frame carrying a triggered response scheduling (TRS) control subfield from an AP. The duration of the HE-STF field 530 in the HE TB PPDU 500 is 8 us, double the size of that in other HE PPDU.

The legacy signal (L-SIG) field, HE-SIG-A field and HE-SIG-B field carry physical layer control information for the PPDU. The L-SIG field is with legacy numerology and format, so that all the STAs understand L-SIG field. The HE-SIG-A field and HE-SIG-B field are understood by HE STAs. The L-SIG fields are provided in Table 1 below.

TABLE 1

| L-SIG field | bits |
|---|---|
| Rate | 4 |
| Length | 12 |
| CRC | 1 |
| Tail | 6 |

HE-SIG-A fields for different PPDU formats are provided in Table 2 below.

TABLE 2

| HE SU PPDU and HE ER SU PPDU | | HE MU PPDU | | HE TB PPDU | |
|---|---|---|---|---|---|
| Field | bits | field | bits | field | bits |
| format | 1 | UL/DL | 1 | Format | 1 |
| Beam change | 1 | SIGB MCS | 3 | BSS Color | 6 |
| UL/DL | 1 | SIGB DCM | 1 | Spatial Reuse 1 | 4 |
| MCS | 4 | BSS Color | 6 | Spatial Reuse 2 | 4 |
| DCM | 1 | Spatial Reuse | 4 | Spatial Reuse 3 | 4 |
| BSS color | 6 | Bandwidth | 3 | Spatial Reuse 4 | 4 |
| Reserved | 1 | # of SIGB Symbols or MU-MIMO users' | 4 | Reserved | 1 |
| Spatial Reuse | 4 | SIGB Compression | 1 | Bandwidth | 2 |
| Bandwidth | 2 | GI + LTF size | 2 | TXOP | 7 |
| GI + LTF | 2 | Doppler | 1 | Reserved | 9 |
| NSTS and Midamble Periodicity | 3 | TXOP | 7 | CRC | 4 |

TABLE 2-continued

| HE SU PPDU and HE ER SU PPDU | | HE MU PPDU | | HE TB PPDU | |
|---|---|---|---|---|---|
| Field | bits | field | bits | field | bits |
| TXOP | 7 | Reserved | 1 | Tail | 6 |
| Coding | 1 | # of HE-LTF symbols and midamble periodicity | 3 | | |
| LDPC Extra Symbol Segment | 1 | LDPC extra symbol segment | 1 | | |
| STBC | 1 | STBC | 1 | | |
| Beam formed | 1 | Pre-FEC Padding factor | 2 | | |
| Pre-FEC Padding Factor | 2 | PE disambiguity | 1 | | |
| PE Disambiguity | 1 | CRC | 4 | | |
| Reserved | 1 | Tail | 6 | | |
| Doppler | 1 | | | | |
| CRC | 4 | | | | |
| Tail | 6 | | | | |

IEEE 802.11ba defines a physical layer specification and MAC layer specification that enables operation with Wake-Up Radio (WUR) for IEEE 802.11 devices.

Figure 6:
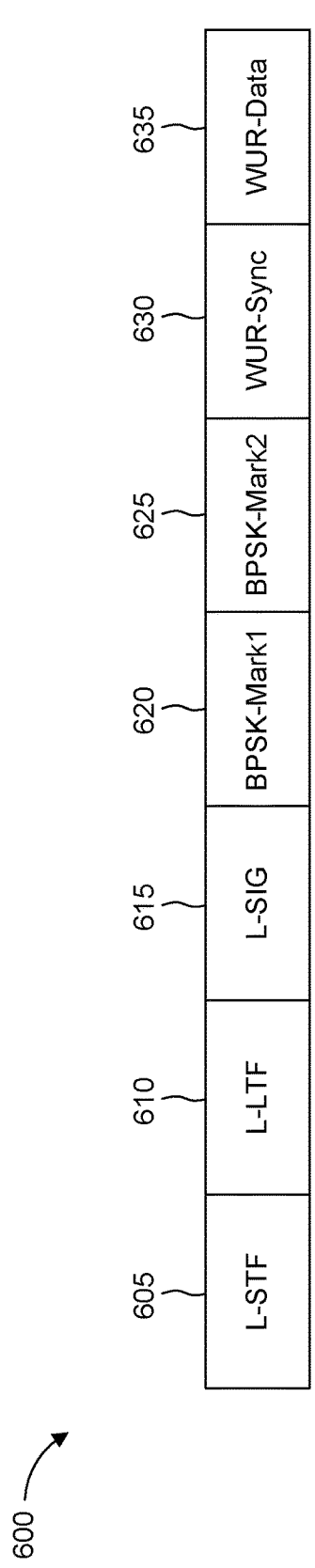
FIG. 6 is a diagram illustrating an example wake-up radio (WUR) basic PPDU format.

FIG. 6 illustrates an example wake-up radio (WUR) basic PPDU format 600, which may be used in combination of any of other embodiments described herein. As illustrated in FIG. 6, the WUR basic PPDU 600 may comprise L-STF 605, L-LTF 610, L-SIG 615, BPSK-Mark1 620, BPSK-Mark2 625, WUR-Sync 630, and WUR-Data 635.

Figure 7:
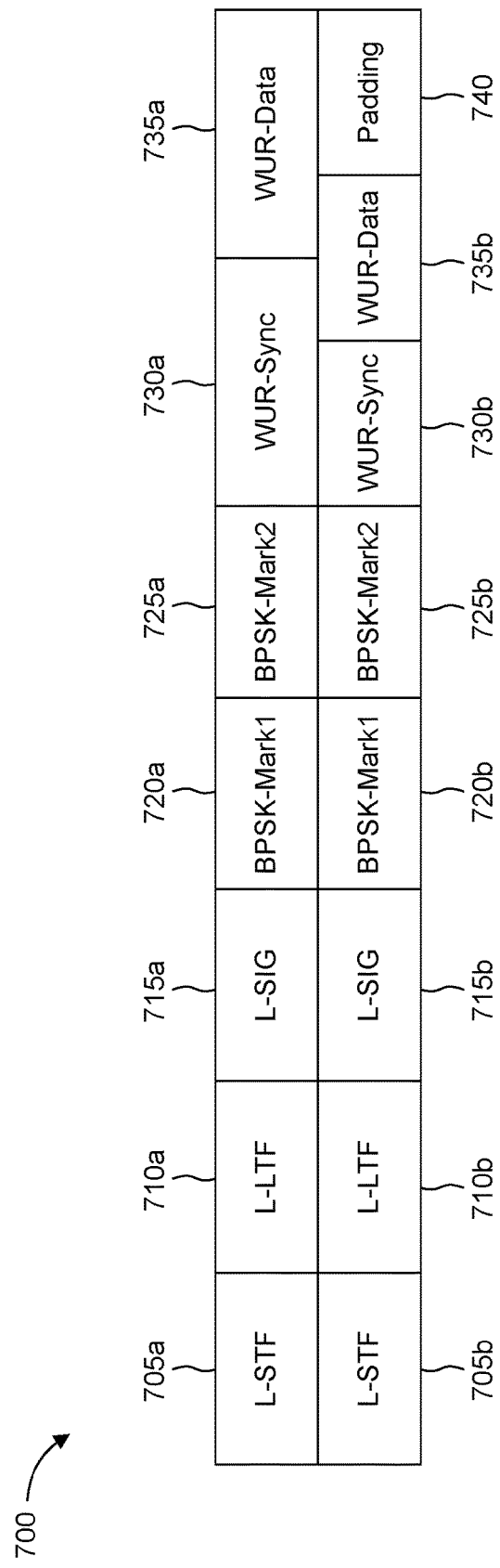
FIG. 7 is a diagram illustrating an example wake-up radio frequency division multiple access physical layer convergence procedure protocol data unit (WUR FDMA PPDU) format.

FIG. 7 illustrates an example wake-up radio frequency division multiple access physical layer convergence procedure protocol data unit (WUR FDMA PPDU) format 700, which may be used in combination of any of other embodiments described herein. As illustrated in FIG. 7, the WUR FDMA PPDU 700 may comprise L-STF 705a, 705b, L-LTF 710a, 710b, L-SIG 715a, 715b, BPSK-Mark1 720a, 720b, BPSK-Mark2 725a, 725b, WUR-Sync 730a, 730b, WUR-Data 735a, 735b and padding 740.

Auto IEEE 802.11ba PPDU detection is based on the structure of BPSK-Mark1 720a and BPSK-Mark2 720b.

Figure 8:
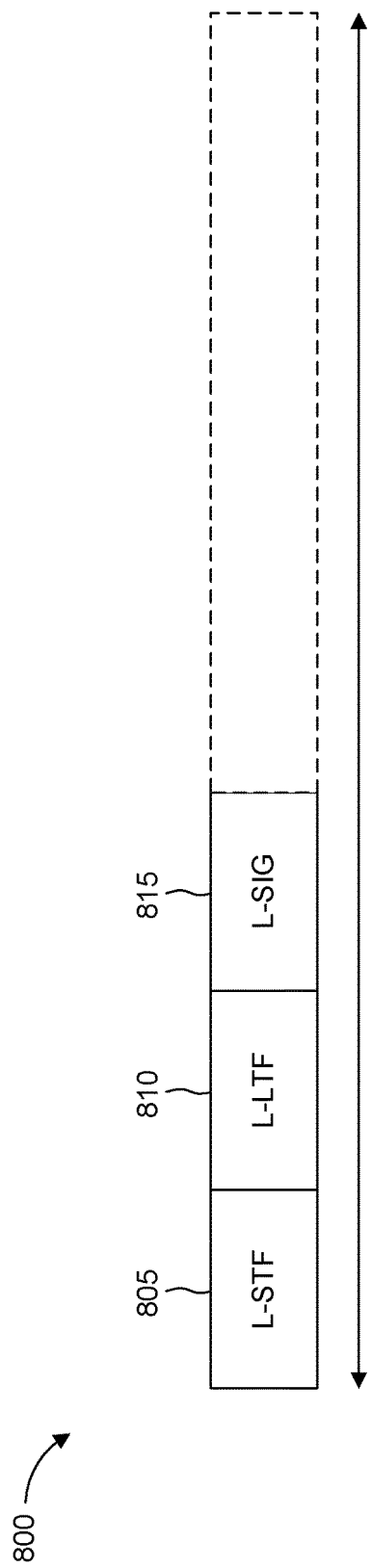
FIG. 8 is a diagram illustrating an example IEEE 802.11bd 10 MHz bandwidth PPDU format.

FIG. 8 illustrates an example IEEE 802.11bd 10 MHz bandwidth PPDU format 800, which may be used in combination of any of other embodiments described herein. The IEEE 802.11bd provides the Next Generation Vehicular (NGV) technology to the underlying 802.11 wireless LAN networks and is an enhanced V2X technology while keeping backward compatibility with IEEE 802.11p. The IEEE 802.11bd 10 MHz bandwidth PPDU format 800 may include L-STF 805, L-LTF 810, and L-SIG field 815 as illustrated in FIG. 8.

Figure 9:
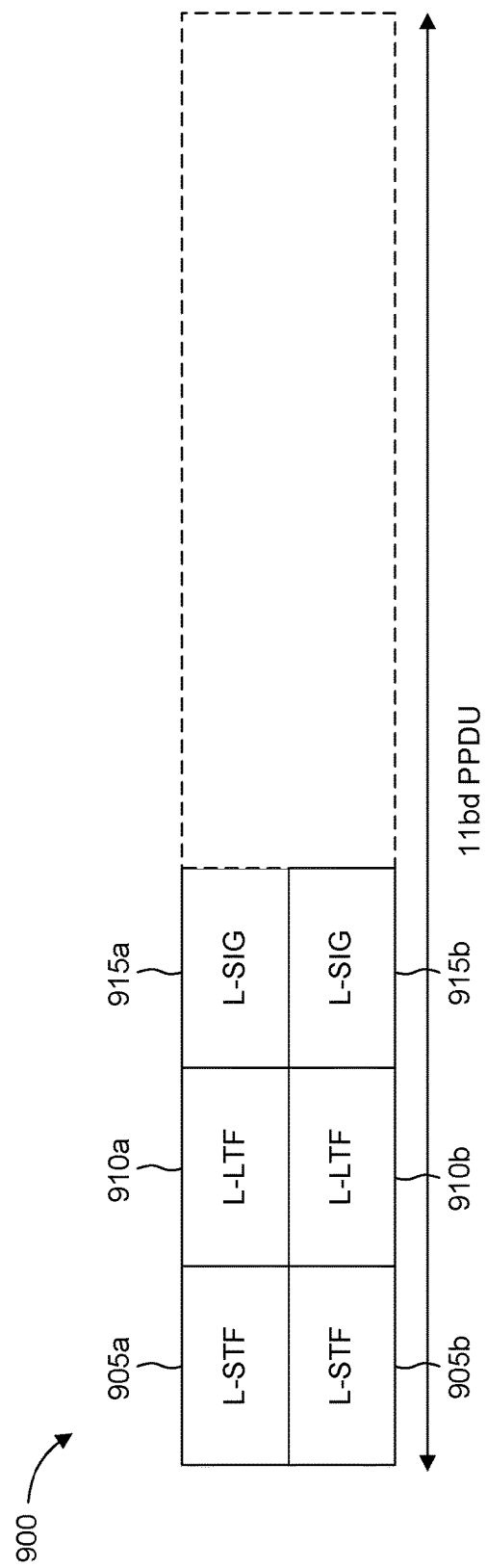
FIG. 9 is a diagram illustrating an example IEEE 802.11bd 20 MHz bandwidth PPDU format.

FIG. 9 illustrates an example IEEE 802.11bd 20 MHz bandwidth PPDU format 900, which may be used in combination of any of other embodiments described herein. The IEEE 802.11bd 20 MHz bandwidth PPDU format 900 may include duplicated L-STF 905a, 905b, L-LTF 910a, 910b, and L-SIG 915a, 915b for each 10 MHz PPDU as illustrated in FIG. 9.

In addition, the IEEE 802.11bd PPDU design may support midamble(s) in data field. An IEEE 802.11bd STA may indicate the NGV capability in MAC level, when transmitting a IEEE 802.11p PPDU.

IEEE 802.11be Extremely High Throughput (EHT) is the potential next amendment of the 802.11 IEEE standard. It is built upon IEEE 802.11ax, focusing on WLAN indoor and outdoor operations. The applications that are targeted to be supported by IEEE 802.11be include, but are not limited to:

4K/8K video, gaming, virtual and augmented reality, remote office, cloud computing, or the like.

Although there are auto detection methods for all the existing standard versions, a physical version identifier field (e.g., 3-4 bits) in PHY header may be included/added to explicitly indicate the standard version starting from IEEE 802.11be.

The term legacy be referred to as IEEE 802.11ax or older IEEE 802.11 standards such as IEEE 802.11a, IEEE 802.11n, IEEE 802.11ac and/or IEEE 802.11p throughout this disclosure. The term new, newer version, or future may be referred to as IEEE 802.11 standards after IEEE 802.11ax such as IEEE 802.11be, IEEE 802.11bd, and/or IEEE 802.11bb throughout this disclosure.

IEEE 802.11ax adopted significant changes in physical layer and thus corresponding changes are included in PHY header. For example, transmit opportunity (TXOP) duration is included in HE-SIG-A field so a HE STA may set network allocation vector (NAV) based on PLOP header detection.

PPDU design for newer versions such as IEEE 802.11be, 11bd, or 11bb may consider supporting IEEE 802.11ax devices so that it may still understand important information, such as TXOP duration in the EHT PPDU.

IEEE 802.11ax introduced the TXOP_DURATION and BSS_COLOR in the PHY as TXVECTORs and RXVECTORs such that the NAV and a shortened BSS identity are directly signaled in the TXOP and BSS color fields in the PHY header HE SIG-A. With TXOP in the header, a third party STA does not need to decode the PLOP service data unit (PSDU) to update its NAV when it hears a PPDU from another BSS or not in a UL/DL direction which it should receive. Based on BSS color in the header, a STA may update either intra-BSS NAV or basic NAV. Since there is no need to decode PPDU for a NAV update, based on BSS color and UL/DL indication or STA-ID in the header, a STA may enter intra-PPDU power save. Based on BSS color in an observed PPDU, an IEEE 802.11ax STA may perform spatial reuse transmission if the received signal strength indicator (RSSI) of the observed OBSS PPDU does not exceed a threshold.

Legacy devices may refer to IEEE 802.11a, IEEE 802.11n, IEEE 802.11ac, IEEE 802.11ax, and/or IEEE 802.11p devices. Future devices may refer to IEEE 802.11be, IEEE 802.11bd, and/or later devices.

For each new amendment, both the PHY header and PSDU in a newer PPDU format were not understood by the legacy devices. This creates limitations. First, because the NAV signaled in newer PPDU formats (e.g., either in a new header or in PSDU) is not understood by legacy STAs, the TXOP may need to be protected by separate, duplicate non-HT formal PPDUs ahead of more efficient PPDU transmissions even in a band not currently used by non-HT STAs.

Second, a legacy STA cannot determine the BSSID of newer format PPDU and cannot effectively perform spatial reuse. For example, even with an observed new format PPDU received with a very low RSSI, a non-AP legacy STA cannot perform spatial reuse transmission because it does not know whether the ongoing PPDU is being transmitted or received by the associated AP. Further, the legacy STA cannot understand the spatial reuse restrictions signaled in the header of the newer PPDU and may violate the restriction by performing spatial reuse transmission.

Third, a legacy STA cannot determine the BSSID of a newer format PPDU and effective perform intra-PPDU power save. When a legacy non-AP STA receives a newer format PPDU, even if the RSSI of the PPDU is low and the legacy auto detection methods exclude the PPDU as a possible format that can be decoded by the STA, the STA cannot perform intra-PPDU power save because its associated AP may start sending a packet to the STA within the duration of this newer format PPDU.

Fourth, each new amendment needs to create a new auto detection mechanism such that the newer format PPDU will not be mistaken as a legacy format PPDU and vice versa, by either new or legacy STAs. Since a new PHY header is not understood by legacy STAs, this mechanism cannot be achieved by coded information bits in the new PHY header.

Due to the limitations discussed above, an IEEE 802.11ax STA cannot update its NAV, perform spatial reuse, or intra-PPDU power save if it receives a newer format/version PPDU.

In EHT, features such as Semi-Orthogonal Multiple Access (SOMA) were proposed such that a DL PPDU can carry information to a near STA and a far STA on the same frequency-time-spatial resource. This SOMA operation is transparent to the far STA. That is, the far STA can be an IEEE 802.11ax STA while the near STA is an EHT STA. In this case, a legacy-friendly preamble is needed that is understood by the far legacy STA while signaling additional information to the near EHT STA.

In order to be backward compatible with legacy devices, legacy PPDU may be transmitted by the newer version STAs. It would be beneficial if a newer version STA included information which is not part of legacy signaling in legacy PPDU.

Version indication or identifier may indicate further IEEE 802.11 standard versions. However, the current PHY header is already lengthy and detection of the version has become complicated. With explicit version indication, one or more OFDM symbols are expected to be added to the PHY header. As such, a method which can signal the version identifier with no additional overhead should be considered.

A midamble is considered in IEEE 802.11ax and IEEE 802.11bd for high Doppler scenarios. However, a midamble introduces extra overhead and a midamble may be needed in any case. For example, some STAs may have decision feedback channel estimation receivers which may achieve good performance even in high Doppler cases. However, some STAs may not have decision feedback channel estimation receivers and may not need a midamble. A midamble adoption procedure may be needed such that a transmitter may reasonably choose to use a midamble, and/or a midamble with different periodicities.

Embodiments for legacy friendly preamble design are described herein. The beginning of EHT SIG may be based on HE-SIG-A. For example, certain fields in EHT SIG may be understood by HE STAs as fields in HE-SIG-A and may be checked via cyclic redundancy check (CRC) for correct reception by both HE and EHT STAs.

FIG. 10 illustrates a legacy-friendly extremely high throughput signal (EHT SIG) field 1000 using HE-SIG-A of an HE SU PPDU, which may be used in combination of any of other embodiments described herein. As illustrated in FIG. 1010, the EHT SIG field 1000 using HE-SIG-A may include, but are not limited to, format field 1005, version ID field 1010, UL/DL field 1015, EHT field1 1020, BSS color field 1025, reserved bit 1030, spatial reuse field 1035, EHT field2 1040, TXOP field 1045, undecided 1050, other field 1055, undecided 1060, reserved bit 1065, undecided 1070 and CRC+Tail field 1075. The format field 1005, the UL/DL field 1015, the BSS color field 1025, the spatial reuse field 1035, the TXOP field 1045, and the CRC+Tail field 1075 may need to be understood by the HE STAs. There may be one or more other fields 1055 in the HE-SIG-A that would be beneficial to be understood by the HE STAs. The one or more other fields 1055 may not be in the exact position illustrated in FIG. 10.

For EHT STAs, one or more of the reserved bits 1030, 1065 may be set to 0, or a value different than the IEEE 802.11ax reserved value, to indicate to EHT STAs that the SIG is to be interpreted as an EHT SIG. The fields 1010, 1020, 1040, 1050, 1060, 1070 and other unused reserved bit(s) 1030, 1065 may be refused for EHT signaling, such as a PHY version identifier field, and various other EHT fields. In one embodiment, instead of using a reserved bit 1030 or 1065 to signal the EHT preamble, a reserved value of other fields in HE-SIG-A may be used, such as MCS=12~15. In another embodiment, the EHT field(s) 1020, 1040 may indicate there are additional EHT preamble fields, such as SIG or training, following the legacy-friendly SIG. The presence of EHT fields may implicitly signal the presence of additional EHT preamble fields following the legacy-friendly SIG.

For HE STAs, certain settings may be utilized such that the HE STAs would not attempt to decode the symbols after the HE-SIG-A. In one embodiment, the UL/DL field 1015 may be set to UL to prevent a non-AP STA to further process the PPDU. The BSS color field 1025 may prevent an OBSS IEEE 802.11ax AP to further process this PPDU. The format field 1005, the UL/DL field 1015, the BSS color field 1025, the spatial reuse field 1035, the TXOP field 1045, and/or the CRC+Tail field 1075 may be set as in HE-SIG-A, such that a third party HE STA would understand BSS color, TXOP, and/or spatial reuse restrictions to correctly set intra-BSS/basic NAV, perform intra-PPDU power save and/or spatial reuse transmissions. The CRC may be calculated based on the bits shown in FIG. 10. Thus, HE and/or the intended EHT STA(s) may determine the correctness of the preamble. For example, L_LENGTH %3=1 in LSIG, Format=1, UL/DL=UL, BSS Color, TXOP, and Spatial Reuse may be set to the values associated with the color/NAV/spatial reuse restrictions of the PPDU. An intra-BSS HE STA may see the EHT PPDU as an UL HE SU PPDU from the same BSS and set an intra-BSS NAV based on the TXOP field and perform an intra-PPDU power save. An OBSS HE STA may see the EHT PPDU as an UL HE SU PPDU from an OBSS. It may not perform an intra-PPDU power save. The OBSS HE STA may ignore the PPDU based on the RSSI and the restrictions indicated in the Spatial Reuse field. The OBSS HE STA may perform spatial reuse transmission that overlaps the duration of the PPDU. If the PPDU is not ignored, then the OBSS HE STA updates its basic NAV based on the TXOP field. The EHT or future amendment STA may be based on a set of one or more fields 1010, 1020, 1040, 1050, 1060, 1070 and/or one or more reserved bits 1030, 1065 to understand the PHY version of the PPDU. The EHT or future amendment STA may determine, based on the PHY version, the interpretations of other one or more fields 1010, 1020, 1040, 1050, 1060, 1070 and/or one or more reserved bits 1030, 1065 and may determine what is the signal that follows the legacy friendly SIG, such as an additional EHT-SIG-X.

A legacy-friendly preamble may be made suitable for Range Extension by using the format of HE-SIG-A for an UL HE ER SU PPDU (i.e. L_LENGTH %3=2 in L-SIG). The legacy-friendly SIG may be repeated to be 4 symbols long.

The above example uses HE-SIG-A for UL (ER) SU PPDU as a legacy-friendly SIG. The HE-SIG-A for HE MU-PPDU or HE TB-PPDU can also be used for the same purpose, such that certain fields (e.g., BSS color and TXOP) can be interpreted by HE STAs and check for correctness, while other fields are used for EHT signaling. For example, in one embodiment, the legacy-friendly SIG may be interpreted by HE STAs as the HE-SIG-A of a UL HE MU PPDU. The one or more reserved bits or one or more reserved values of one or more fields in the HE-SIG-A may indicate to EHT STAs that it is a legacy friendly SIG.

In another embodiment, the legacy-friendly SIG may be interpreted by HE STAs as the HE-SIG-A of a DL HE MU PPDU. One or more reserved values of one or more fields in the HE-SIG-A may indicate to EHT STAs that it is a legacy-friendly SIG, such as SIGB MCS=6 or 7.

In other embodiments, the legacy-friendly SIG is interpreted by HE STAs as the HE-SIG-A of a DL HE SU PPDU or DL ER SU PPDU.

In another embodiment, the legacy-friendly SIG may be interpreted by HE STAs as the HE-SIG-A of a DL HE MU-PPDU. The MCS field may indicate an unsupported rate for HE STAs. The setting may indicate to EHT STAs that it is a legacy-friendly SIG.

In another embodiment, the legacy-friendly SIG may be interpreted by HE STAs as the HE-SIG-A of a HE TB PPDU. The one or more reserved bits or one or more reserved values of one or more fields in the HE-SIG-A may indicate to EHT STAs that it is a legacy-friendly SIG.

In IEEE 802.11ax, a reserved HE-SIG-A indication is defined as an HE-SIG-A with reserved bits equal to 0 or any other HE-SIG-A field bit combinations that do not correspond to modes of PHY operation defined in the PHY clause of the IEEE 802.11ax amendment.

If the HE-SIG-A field indicates a reserved HE-SIG-A indication, the IEEE 802.11ax PHY entity may issue the error condition PHY-RXEND.indication(FormatViolation) primitive, and the PHY entity may report TXOP, BSS Color, or other fields defined in HE-SIG-A such as Uplink flag (UL/DL), spatial reuse, etc. to the MAC layer. The report to the MAC layer may be conditioned on the HE-SIG-A field indicating a valid CRC.

In IEEE 802.11ax, a reserved HE-SIG-A indication is defined as an HE-SIG-A with reserved bits equal to 0 or any other HE-SIG-A field bit combinations that do not correspond to modes of PHY operation defined in the PHY cause of the IEEE 802.11ax amendment.

If the HE-SIG-A field indicates a reserved HE-SIG-A indication, the IEEE 802.11ax PHY may issue the error condition PHY-RXEND.indication(FormatViolation) primitive, and the PHY entity may report TXOP, BSS Color, or other fields defined in HE-SIG-A, such as UL flag or spatial reuse, to the MAC layer. The report to the MAC layer may be conditioned on the HE-SIG-A field indicating a valid CRC.

Figure 11:
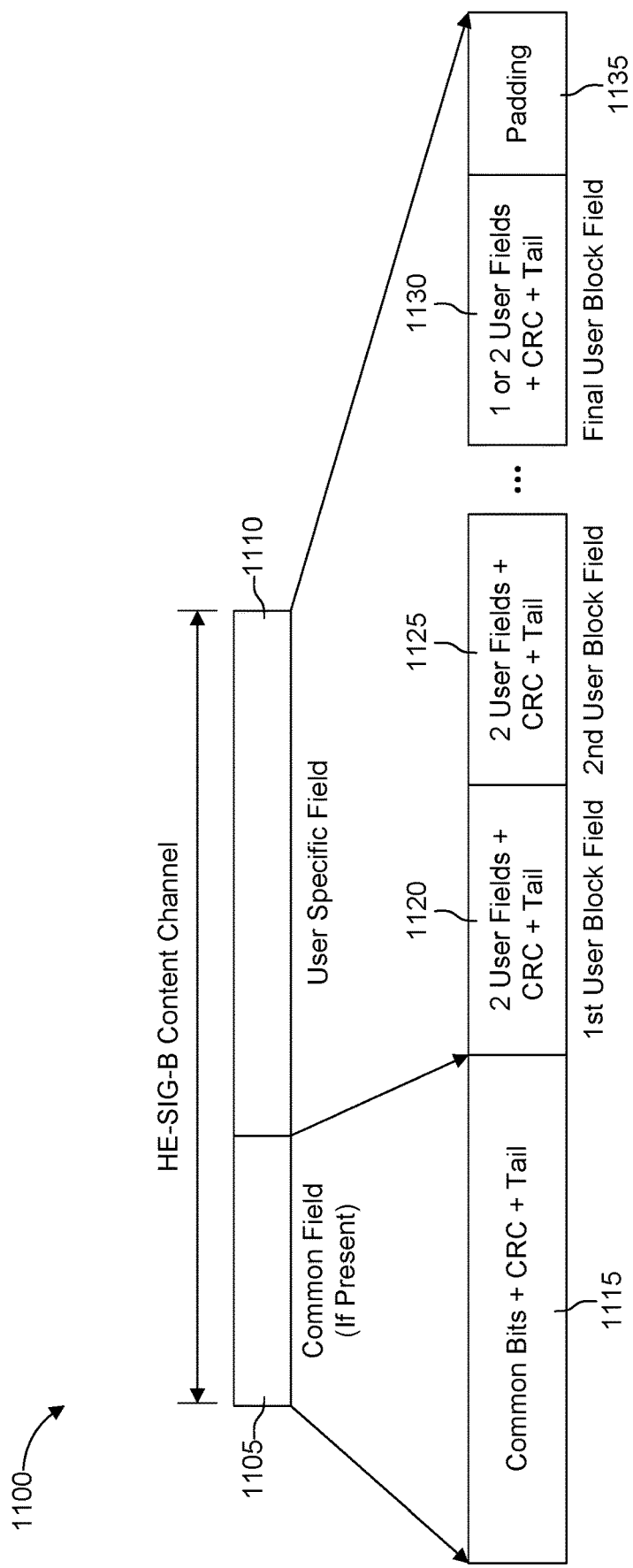
FIG. 11 is a diagram illustrating an example HE-SIG-B content channel format.

FIG. 11 illustrates an example HE-SIG-B content channel format 1100, which may be used in combination of any of other embodiments described herein. As illustrated in FIG. 11, the HE-SIG-B content channel 1100 comprises a common field 1105 and a user specific field 1110. The common field 1105 may include common bits+CRC+Tail. The user specific field 1110 may include 2 user fields+CRC+Tail 1120, 2 user fields+CRC+Tail 1125, 1 or 2 user fields+CRC+Tail 1130, and padding 1135. The length of the HE-SIG-B content channel 1100 may be determined by the number of HE-SIG-B Symbols or MU-MIMO Users field in the HE-SIG-A of an HE MU PPDU up to 16 symbols. This may address the issue described above for multiplexing the data for IEEE 802.11ax and EHT non-AP STAs.

The EHT transmitter may increase the value of this field to increase the length of padding. A subset of the padding bits may be used as information fields (e.g., Common and User Block) for EHT STAs that share the same time/frequency/spatial resource as those HE STAs signaled before the padding bits.

The IEEE 802.11ax allows the padding bits to be set to any value, so the EHT STAs cannot use the padding bits to determine whether they are used as information fields. One or more reserved bits in HE-SIG-A may be used to indicate the subset of padding bits to be interpreted as information fields to the EHT STAs.

The information fields may include, but are not limited to, the following information: explicit or implicit information to indicate the portion of bits that an EHT STA needs to decode; the STA-ID of the EHT STA, and which set of time/frequency/spatial resources indicated in the legacy SIG-B Common and User Block fields is assigned to the STA; and/or information needed for the EHT STA to receive data, such as MCS, the power difference between near/far STAs, and coding.

In some scenarios, a newer version STA may still need to transmit a legacy PPDU. In one embodiment, an IEEE 802.11bd STA may need to broadcast/multicast an IEEE 802.11p PPDU to communicate with IEEE 802.11p and IEEE 802.11bd STAs. In this embodiment, extra information (e.g., information understood by a newer version STA, such as an IEEE 802.11bd STA) may be carried in a legacy PPDU.

A legacy PPDU may have a PHY header. The PHY header may carry legacy PHY header fields and version related header fields. For example, an IEEE 802.11bd PHY header may have L-STF, L-LTF, and L-SIG fields, which are considered as legacy PHY header fields. Legacy header fields may be understood by all the STAs. A IEEE 802.11bd PHY header may also include NGV header fields, which may be understood by IEEE 802.11bd STAS (i.e., NGV STAs).

The legacy header uses IEEE 802.11a numerology or downclocks from IEEE 802.11a numerology. IEEE 802.11a numerology has the following key features: 48 data subcarriers, 4 pilot subcarriers, and 312.5 KHz subcarrier spacing. Currently, most of IEEE 802.11 devices in the market understand IEEE 802.11n/ac numerology, which include the following key features: 52 data subcarriers, 4 pilot subcarriers, and 312.5 KHz subcarrier spacing. The main difference is the number of data subcarriers increases from 48 to 52.

Figure 12:
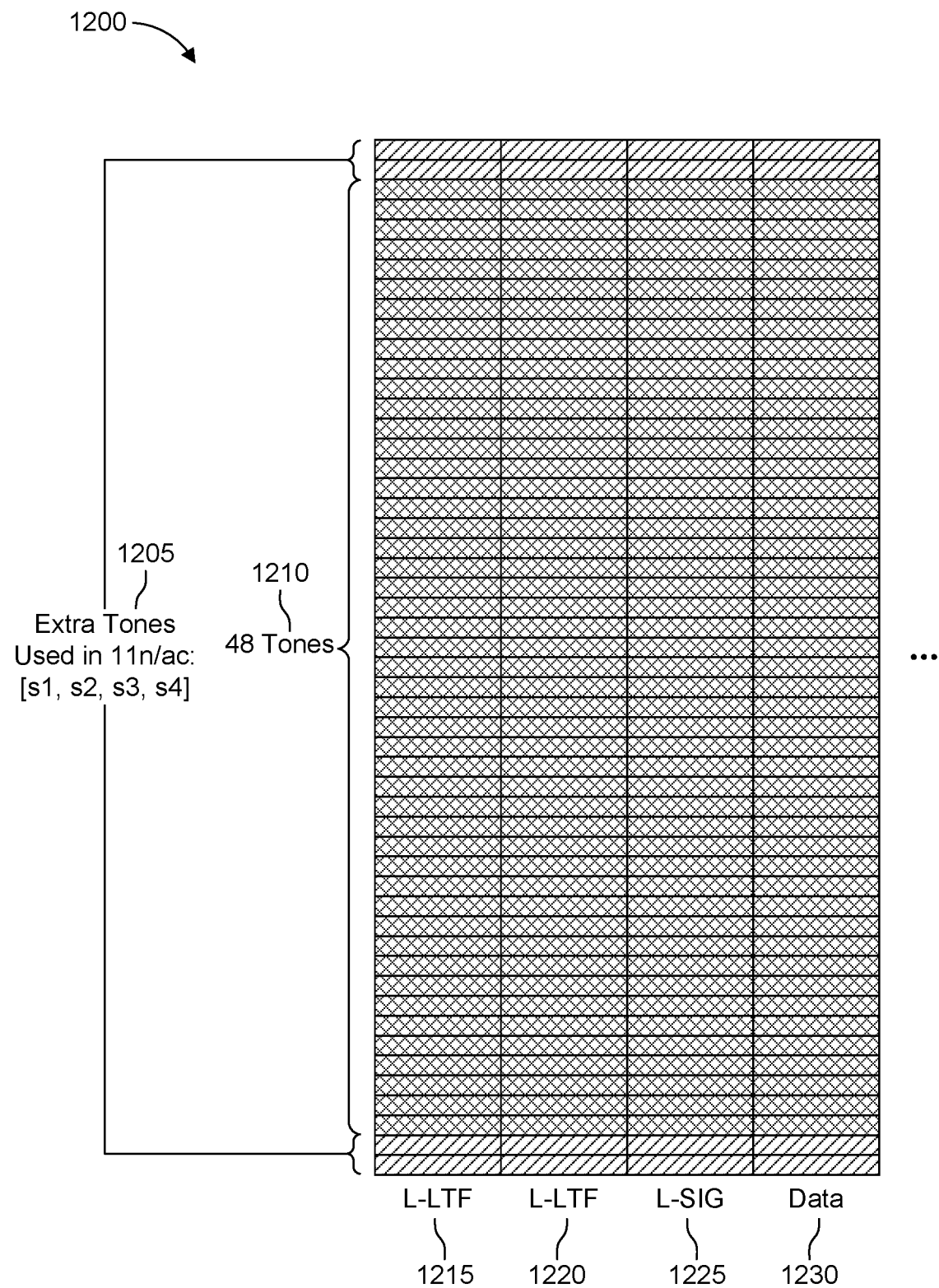
FIG. 12 is a diagram illustrating extra tones used in legacy fields and data field for signaling.

FIG. 12 illustrates extra tones 1200 used in legacy fields and data field for signaling, which may be used in combination of any of other embodiments described herein. As illustrated in FIG. 12, four extra tones per symbol in legacy header fields and/or data field may be used to signal additional information for future devices. Each symbol may indicate L-LTF 1215, L-LTF 1220, L-SIG 1225, and data 1230. Each symbol may also include 48 tones 1212 and four extra tones 1205, for example used in 11n/ac. A matrix [S1, S2, S3, S4] may represent the four extra tones 1205 in one symbol. As used herein, the terms tone and subcarrier may be used interchangeably throughout this disclosure. A tone may refer to a location of subcarriers and carry sequence representing information.

In one embodiment, sequences with a length of 4 may be used to indicate one or more new features. For example, sequence 1 may be mapped to information 1, sequence 2 may be mapped to information 2, and so on. The transmitting STA may select a sequence and modulate them to the four extra subcarriers or tones 1205 starting from the first L-LTF symbol 1215. The same sequence may be repeated and modulated on each of the OFDM symbols after the first L-LTF symbol until the new numerology may be used.

Legacy devices, such as IEEE 802.11a or IEEE 802.11p devices, may not know the extra tones 1205 and corresponding sequences. Therefore, they may check the 48 tones 1210 for legacy detection.

Future devices may know the extra tones 1205 and corresponding sequences. Therefore, they may check the PPDU for the extra tones 1205. In one embodiment, the receiver may combine the received signals on extra subcarriers across all the legacy OFDM symbols. For example, for the first L-LTF symbol 1215, the received modulated symbols on the extra subcarriers may be denoted according to Equation 1.

$$R_1=[R_{1,-28};R_{1,-27};R_{1,27};R_{1,28}] \quad \text{Equation 1}$$

The second L-LTF symbol 1220 may be denoted according to Equation 2.

$$R_2=[R_{2,-28};R_{2,-27};R_{2,27};R_{2,28}] \quad \text{Equation 2}$$

Similar notations are used for the rest of legacy OFDM symbols. The combination may be performed according to Equation 3.

$$R=[\Sigma_k R_{k,-28};\Sigma_k R_{k,-27};\Sigma_k R_{k,27};\Sigma_k R_{k,28}] \quad \text{Equation 3}$$

Next, modulated symbol detection and/or sequence detection may be performed on vector R. The receiver may detect which sequence was transmitted and thus the corresponding information may be detected.

A variation of this method may be used. For example, in other embodiments, the sequence may not be simply repeated on each of the OFDM symbols. Instead, a frequency hopping pattern may be applied to the 4 extra subcarriers. For example, modulated symbols $[m_1, m_2, m_3, m_4]$ may be mapped to frequency subcarriers $[c_{-28}, c_{-27}, c_{27}, c_{28}]$ for the first legacy OFDM symbol (e.g., the first L-LTF symbol 1215). For the second legacy OFDM symbols (e.g., the second L-LTF symbol 1220), the modulated symbols on subcarriers $[c_{-28}, c_{-27}, c_{27}, c_{28}]$ may be $[m_{p(1)}, m_{p(2)}, m_{p(3)}, m_{p(4)}]$, where $p(\cdot)$ is a permutation function. A similar scheme may be applied to the rest of legacy OFDM symbols.

In one embodiment, sequences with length K may be used to indicate one or more new features. K may be the number of legacy OFDM symbols in the PPDU. In another embodiment, the legacy fields may include two L-LTF symbols, one L-SIG symbol and followed by the OFDM symbols with new numerology. Therefore, there may be 3 legacy OFDM symbols and K may equal 3. In another embodiment, the legacy fields may include two L-LTF symbols, one L-SIG symbol, and one repeated L-SIG symbol, and followed by the OFDM symbols with new numerology. Therefore, there may be 4 legacy OFDM symbols and K may equal 4. The transmitting STA may select a sequence and modulate them to the first extra subcarrier (e.g., with subcarrier index −26) starting from the first L-LTF symbol to the last legacy OFDM symbol. The same sequence may be repeated and modulated on each of the extra subcarriers.

Legacy devices, such as IEEE 802.11a and IEEE 802.11p devices, may not know the extra tones and corresponding sequences. Therefore, they may check the 48 tones for legacy detection.

Future devices may know the extra tones and corresponding sequences. Therefore, they may check the PPDU for extra tones. In one embodiment, the receiver may combine the received signals on extra subcarriers across all the legacy OFDM symbols. For example, for the first L-LTF symbol, the received modulated symbols on the extra subcarriers may be denoted according to Equation 4.

$$R_1 = [R_{1,-28}; R_{1,-27}; R_{1,27}; R_{1,28}] \quad \text{Equation 4}$$

The receiver may combine the received modulated symbols on the extra subcarriers according to Equation 5.

$$R_1^c = \sum_{m \in \{-28,-27,27,28\}} R_{1,m} \quad \text{Equation 5}$$

The receiver may perform a similar process for all of the legacy OFDM symbols and collect a vector according to Equation 6.

$$R = [R_1^c \ldots ; R_2^c] \quad \text{Equation 6}$$

The receiver may perform modulated symbol detection and/or sequence detection on R to determine which sequence may be used by the transmitter.

In one embodiment, sequences with length 4×K may be used to indicate one or more new features. Here, K may be the number of legacy OFDM symbols in the PPDU. In another embodiment, the legacy fields may include two L-LTF symbols, one L-SIG symbol, and followed by the OFDM symbols with new numerology. Therefore, there may be 3 legacy OFDM symbols and K may equal 3. In another embodiment, the legacy fields may include two L-LTF symbols, one L-SIG symbol, and one repeated L-SIG symbol, followed by the OFDM symbols with new numerology. Therefore, there may be 4 legacy OFDM symbols and K may equal 4. The transmitting STA may select a sequence and modulate them to 4K extra subcarrier (e.g., with subcarrier index −28, −27, 27, 28) starting from the first L-LTF symbol to the last legacy OFDM symbol (e.g., K OFDM symbols).

In some embodiments, the information that may be carried in the extra subcarriers may be standard version indication and/or transmission mode indication.

In an embodiment of standard version indication, one sequence may indicate that the STA may be an NGV STA or NGV capable STA. In another embodiment of standard version indication, one sequence may indicate that the STA may be an EHT STA or an EHT capable STA. In another embodiment of standard version indication, one sequence may indicate that the STA may be an EHT or EHT plus STA.

In an embodiment of transmission mode indication, one sequence may indicate that the STA may support multi-link transmission. In another embodiment of transmission mode indication, one sequence may indicate that the STA may support multi-AP transmission. In another embodiment of transmission mode indication, one sequence may indicate that the STA may support hybrid automatic repeat request (HARQ) transmission.

Figure 13:
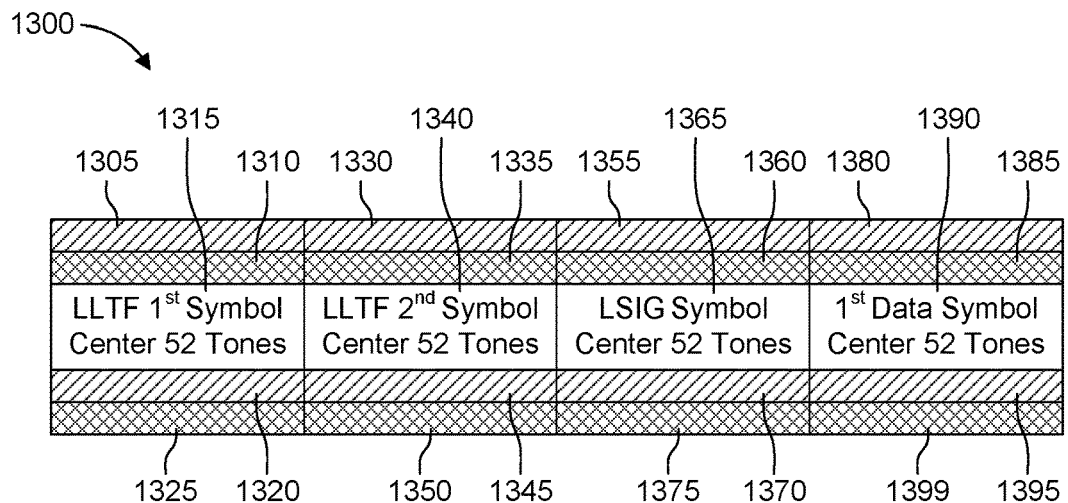
FIG. 13 is a diagram illustrating an example extra tones signaling one information bit.
Figure 14:
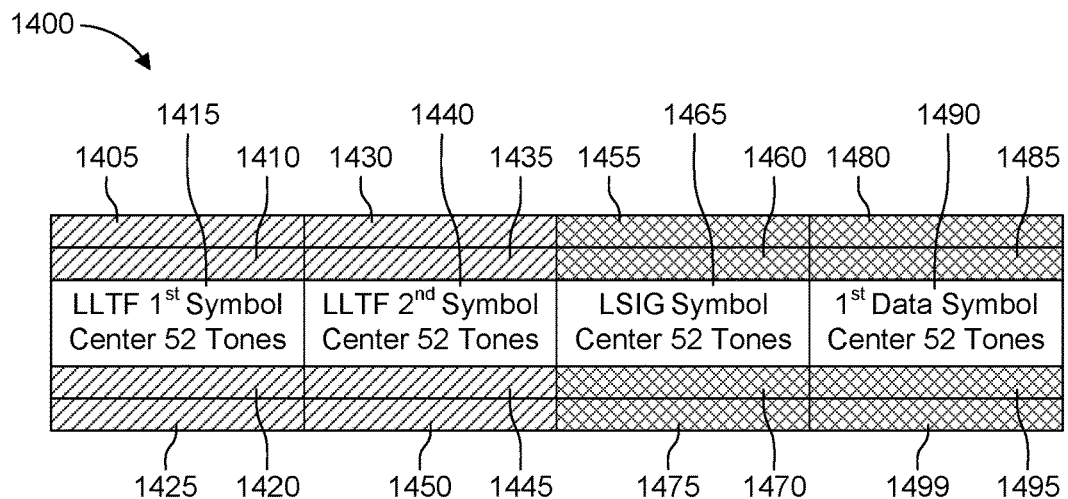
FIG. 14 is a diagram illustrating another example extra tones signaling one information bit.

FIGS. 13 and 14 illustrate examples 1300, 1400 using extra tones to signal 1 bit information, which may be used in combination of any of other embodiments described herein. There are four OFDM symbols shown in both figures form left to right. The four OFDM symbols shown are: L-LTF1 1315 or 1415, L-LTF2 1340 or 1440, L-SIG 1365 or 1465, and the first data symbol 1390 or 1490. Each of the four OFDM symbols represents 52 center subcarriers used in legacy PPDU. In FIG. 13, the extra tones or subcarriers 1305, 1320, 1330, 1345, 1355, 1370, 1380, 1395 may carry modulated sequence 1 and the extra tones or subcarriers 1310, 1325, 1335, 1350, 1360, 1375, 1385, 1399 may carry modulated sequence 2. In FIG. 14, the extra tones or subcarriers 1405, 1410, 1420, 1425, 1430, 1435, 1445, 1450 may carry modulated sequence 1 and the extra tones or subcarriers 1455, 1460, 1470, 1475, 1480, 1485, 1495, 1499 may carry modulated sequence 2. If sequence 1 is the same as sequence 2, information bit 0 may be sent. If sequence 1 is different from sequence 2, information bit 1 may be sent. In an embodiment, sequence 1 may be all 1 sequence and sequence 2 may be all −1 sequence. Non-coherence detection may be used for these two designs. In other words, channel estimation may not be needed for detection. Although four OFDM symbols are used in these embodiments for the purpose of explanation, it is noted that the number of OFDM symbols are not limited to four and may be extended to any number of OFDM symbols to signal any number of bit information using the extra tones.

Figure 15:
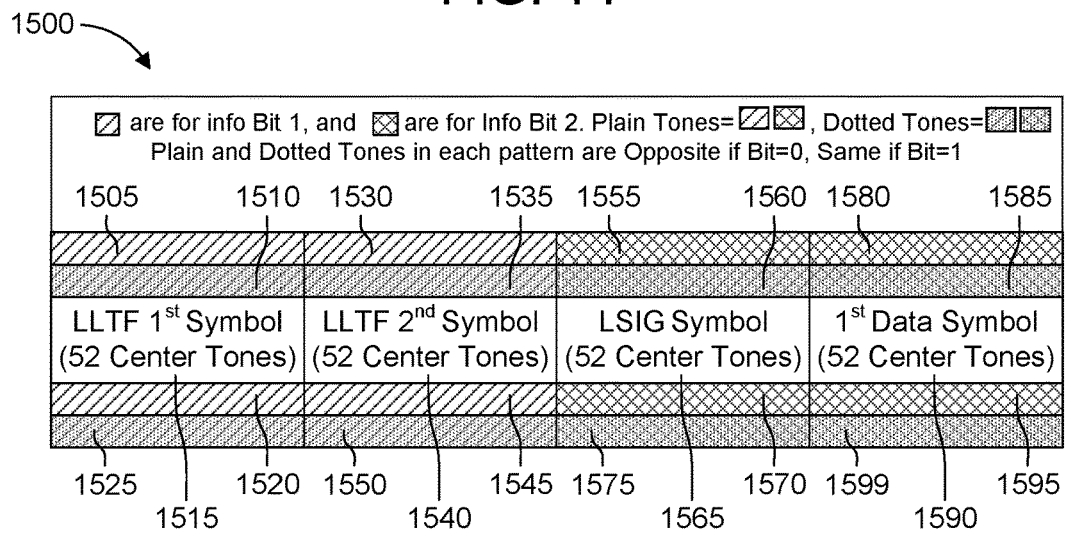
FIG. 15 is a diagram illustrating an example extra tones signaling two information bits.
Figure 16:
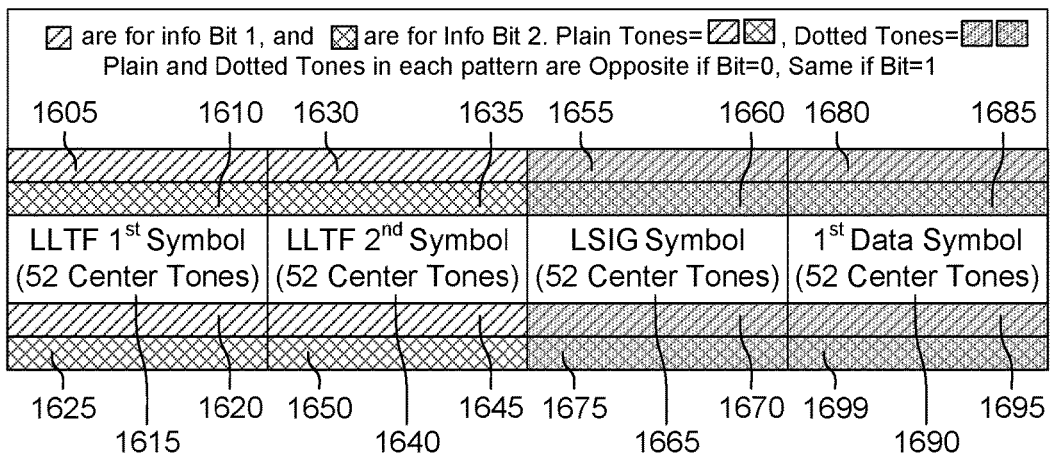
FIG. 16 is a diagram illustrating another example extra tones signaling two information bits.

FIGS. 15 and 16 illustrate examples 1500, 1600 of using extra tones to signal 2 bit information, which may be used in combination of any of other embodiments described herein. There are four OFDM symbols shown in both figures form left to right. The four OFDM symbols shown are: L-LTF1 1515 or 1615, L-LTF2 1540 or 1640, L-SIG 1565 or 1665, and the first data symbol 1590 or 1690. Each of the OFDM symbols represents 52 center subcarriers used in legacy PPDU. In FIG. 15, the extra tones or subcarriers 1505, 1510, 1520, 1525, 1530, 1535, 1545, 1550 may be used to carry the first information bit and the extra tones or subcarriers 1555, 1560, 1570, 1575, 1580, 1585, 1595, 1599 may be used to carry the second information bit. The subcarriers 1505, 1520, 1530, 1545 (i.e. plain part) and the subcarriers 1510, 1525, 1535, 1550 (i.e. dotted part) may be used to carry the same or different sequences to indicate the polarity of information bit 1. The subcarriers 1555, 1570, 1580, 1595 (i.e. plain part) and the subcarriers 1565, 1575, 1585, 1599 (i.e. dotted part) may be used to carry the same or different sequences to indicate the polarity of information bit 2. In FIG. 16, the extra tones or subcarriers 1605, 1620, 1630, 1645, 1655, 1670, 1680, 1695 may be used to carry the first information bit and the extra tones or subcarriers 1610, 1625, 1635, 1650, 1660, 1675, 1685, 1699 may be used to carry the second information bit. The subcarriers 1605, 1620, 1630, 1645, (i.e. plain part) and the subcarriers 1655, 1670, 1680, 1695 (i.e. dotted part) may be used to carry the same or different sequences to indicate the polarity of information bit 1. The subcarriers 1610, 1625, 1635, 1650 (i.e. plain part) and the subcarriers 1660, 1675, 1685, 1699 (i.e. dotted part) may be used to carry the same or different sequences to indicate the polarity of information bit 2. Although four OFDM symbols are used in these embodiments for the purpose of explanation, it is noted that the number of OFDM symbols are not limited to four and may be extended to any number of OFDM symbols to signal any number of bit information using the extra tones.

Figure 17:
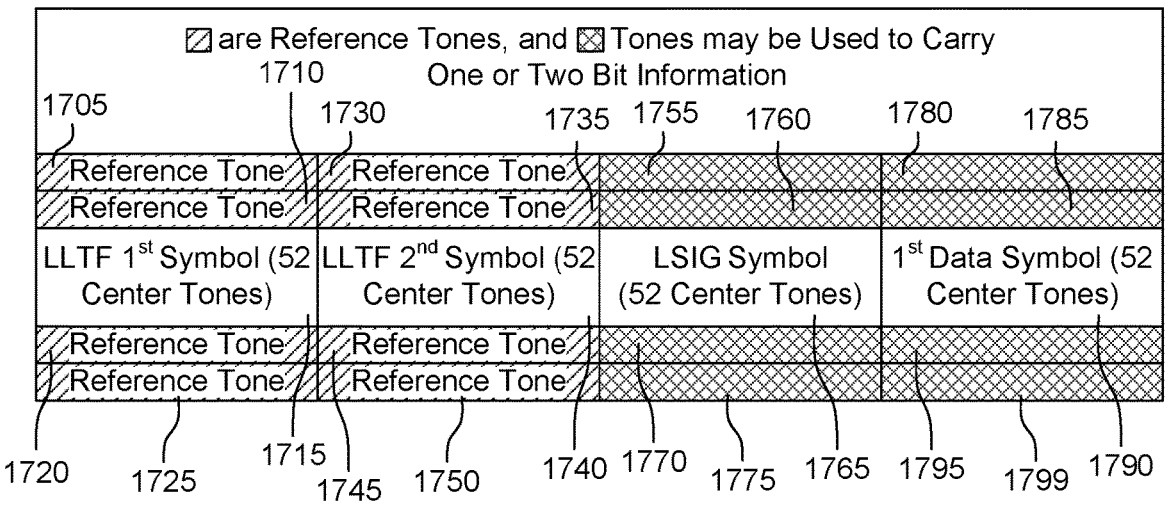
FIG. 17 is a diagram illustrating an example extra tones signaling one or two information bit(s)

FIG. 17 illustrates an example extra tones 1700 signaling one or two information bit(s), which may be used in combination of any of other embodiments described herein. The extra tones (i.e. reference tones) 1705, 1710, 1720, 1725, 1730, 1735, 1740, 1750 are associated with the L-LTF fields 1717, 1740. The reference sequence may be used on the extra tones 1705, 1710, 1720, 1725, 1730, 1735, 1740, 1750. The extra tones 1755, 1760, 1770, 1775, 1780, 1785, 1795, 1799 may be used to carry one or two bit information. Coding and modulation may be applied to the information bits. The receiver with this design may use coherent detection. For example, the receiver may estimate the channel for the extra tones using the reference tones 1705, 1710, 1720, 1725, 1730, 1735, 1740, 1750, and then they may apply coherent detection on the extra tones 1755, 1760, 1770,

1775, 1780, 1785, 1795, 1799. Although four OFDM symbols are used in this embodiment for the purpose of explanation, it is noted that the number of OFDM symbols are not limited to four and may be extended to any number of OFDM symbols to signal any number of bit information using the extra tones In one embodiment, one information bit may be used to indicate if the transmission is a repetition transmission. In another embodiment, one information bit may be used to indicate if the transmission is a new transmission or a retransmission. In another embodiment, one information bit may be used to indicate if the transmission is a first transmission or a second transmission. In another embodiment, one information bit may be used to indicate if the transmission is a retransmission or a last retransmission.

In one embodiment, a bit with a fixed value may be used to indicate the above information. In another embodiment, the bit toggled may be used to indicate the above information.

If two information bits are used, the two information bits may be used to indicate the combination of the above described signaling. In one embodiment, the two bits may indicate the retransmission version, such as the new transmission, first retransmission, second retransmission, third retransmission, or the like.

In one embodiment, one extra tone at each side of the spectrum may be used to carry extra information.

In one embodiments, extra tones with energy and without energy may be used to indicate information.

In one embodiment, a reserved bit in L-SIG field may help to indicate information. For example, the reserved bit in L-SIG may indicate a legacy PPDU transmission with extra tones. The receiver may detect the reserved bit and then perform extra tone detection.

In these embodiments, it is assumed that the extra subcarriers are in tone [−28, −27, 27, 28]. However, the location may be different with different systems. In addition, the number of data symbols in time used for signaling the extra subcarriers may be more than one symbol. In an extreme case, the extra subcarriers for all data symbols in time domain may be used for such signaling.

Repetition transmission may be used to increase the transmission reliability. For example, a broadcast frame may be repeatedly transmitted several times so that a STA with a bad channel may still be able to decode the frame. It may be beneficial if the STA performs HARQ combination of the repeated versions of the same frame. To be backward compatible to legacy STA, a legacy PPDU may be used to carry the frame. It is important to signal new transmission or repetition transmission in legacy PPDU so that a STA may combine the received the packet. In this embodiment, the extra tones in legacy PPDU may be used to indicate if the PPDU may be a new transmission or retransmission. In one embodiment, an NGV broadcast frame transmission may be used.

There may be several predefined sequences. One sequence (e.g., sequence 1) may indicate that the broadcast transmission is a new transmission. Another sequence (e.g., sequence 2) may indicate that the broadcast transmission is a retransmission. The length of the sequence may depend on the signaling with masking.

STA1 may broadcast a frame to its neighboring STAs. STA1 may transmit a legacy PPDU, such as an IEEE 802.11p PPDU. STA1 may modulate sequence 1 on the extra subcarriers to indicate that this is a new transmission. A repetition transmission may follow. In one embodiment, the sequence may be modulated on the PHY header. In another embodiment, the sequence may be modulated on the entire PPDU (i.e., the PHY header and data field).

Legacy STAs in the coverage range of STA1 may detect the legacy PPDU without noticing the use of extra tones. An NGV STA may detect the legacy PPDU and extra tones. By detecting the extra tones, the STA may notice that it is a new broadcast frame. If the STA is unable to detect the data field successfully, the STA may save the received signal in a buffer and wait for the repetition transmission. If the STA is able to detect the data field successfully, the STA may ignore the following repetition transmission.

STA1 may retransmit the broadcast frame to its neighboring STAs x inter-frame spacing (xIFS) time after the first transmission. STA1 may transmit a legacy PPDU, such as an IEEE 802.11p PPDU. STA1 may modulate sequence 2 on the extra subcarriers to indicate that this is a retransmission. In one embodiment, the sequence may be modulated on the PHY header. In another embodiment, the sequence may be modulated on the entire PPDU (i.e., the PHY header and data field).

Legacy STAs in the coverage range of STA1 may detect the legacy PPDU without noticing the use of extra tones. An NGV STA may detect the legacy PPDU and extra tones. By detecting the extra tones, the STA may notice that this is a retransmission of a broadcast frame. If the STA is unable to detect the previous transmission successfully, the STA may combine the received signal with the signal saved in the buffer. The STA may perform detection based on the combined signal. If the STA is able to detect the previous transmission successfully, the STA may ignore the repetition transmission.

The future device (e.g., IEEE 802.11bd) behavior is summarized in Tables 3 and 4 when one information bit is carried by the extra tones. In Table 3, it is assumed that the transmission PPDU is a legacy PPDU with extra tones. In Table 4, it is assumed the transmission PPDU is a legacy PPDU without extra tones transmitted by a legacy PPDU.

TABLE 3

| SIG detection | Extra tone detection | 11 bd or future device behavior |
|---|---|---|
| Yes | Yes, and bit indicates new transmission | May perform legacy PPDU detection first. May buffer the received signal when data detection failed. |
| Yes | Yes, and bit indicates retransmission. | May perform legacy PPDU detection first. May combine current received signal with that saved in buffer. If still failed, buffer the combined signal. |
| Yes | No (miss detection) | Decode the data frame without repetition combining |

TABLE 3-continued

| SIG detection | Extra tone detection | 11 bd or future device behavior |
|---|---|---|
| No | Yes | Option 1: Discard the packet; Option 2: Try combining (assuming in the first transmission SIG was detected and repetition transmissions are continuously transmitted with xIFS separation) |
| No | No | Discard the packet |

TABLE 4

| SIG detection | Extra tone detection | 11 bd or future device behavior |
|---|---|---|
| Yes | Not detected extra tones | May perform legacy PPDU detection first. |
| Yes | Detected extra tones (false alarm) | May perform legacy PPDU detection first. May decode the data frame with repetition combining or buffer the received signal depending on the detected value of the extra tones |
| No | Yes | Option 1: Discard the packet; Option 2: Try combining if the previously save packet was transmitted within certain time period. (a time threshold may be predefined or predetermined) |
| No | No | Discard the packet |

To reduce the chance of false alarm and missed detection, the reserved bit in the L-SIG field may be used. For example, when the reserved bit in L-SIG field is set and extra tone detection is positive, the receiver may believe that extra tones are used. In another example, when the reserved bit in L-SIG field is set, the receiver may believe that extra tones are used and may perform extra tone detection.

The extra tones may be used to indicate if the PPDU transmitted is a new transmission or retransmission of a sequence of repeating PPDUs. The state of this one bit information, denoted as RepState (i.e., Repetition State), may have two values for two of those possible cases. For example, 0 may indicate the first (i.e., new) transmission and 1 may indicate retransmission.

When the sequence of repeating PPDUs is transmitted, each PPDU may carry this information, in which the first PPDU will have RepState=0 and subsequent PPDUs will have RepState=1.

Figure 18:
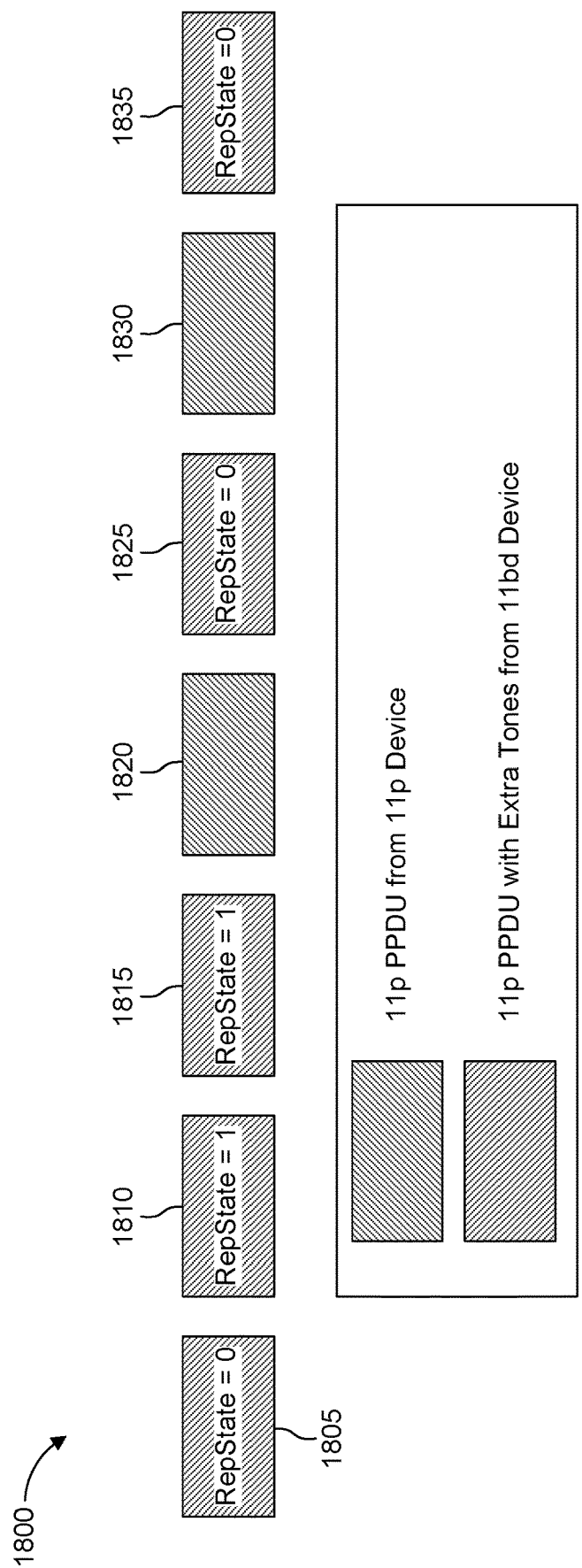
FIG. 18 is a diagram illustrating an example transmission of IEEE 802.11p PPDUs for IEEE 802.11bd devices using RepState to indicate the first PPDU of repeating PPDUs.

FIG. 18 illustrates an example transmission of IEEE 802.11p PPDUs for IEEE 802.11bd devices using RepState to indicate the first PPDU of repeating PPDUs, which may be used in combination of any of other embodiments described herein. As illustrated in FIG. 18, a transmitter may transmit IEEE 802.11p PPDUs 1805, 1810, 1815, 1825, 1835 for future devices (e.g., IEEE 802.11bd device). In this embodiment, the IEEE 802.11p PPDUs 1820, 1830 for IEEE 802.11p devices may optionally be inserted between IEEE 802.11p PPDUs 1805, 1810, 1815, 1825, 1835 for future devices (e.g., IEEE 802.11bd devices). By doing so, the receiver can use this one bit information to decode and combine the PPDU.

Figure 19:
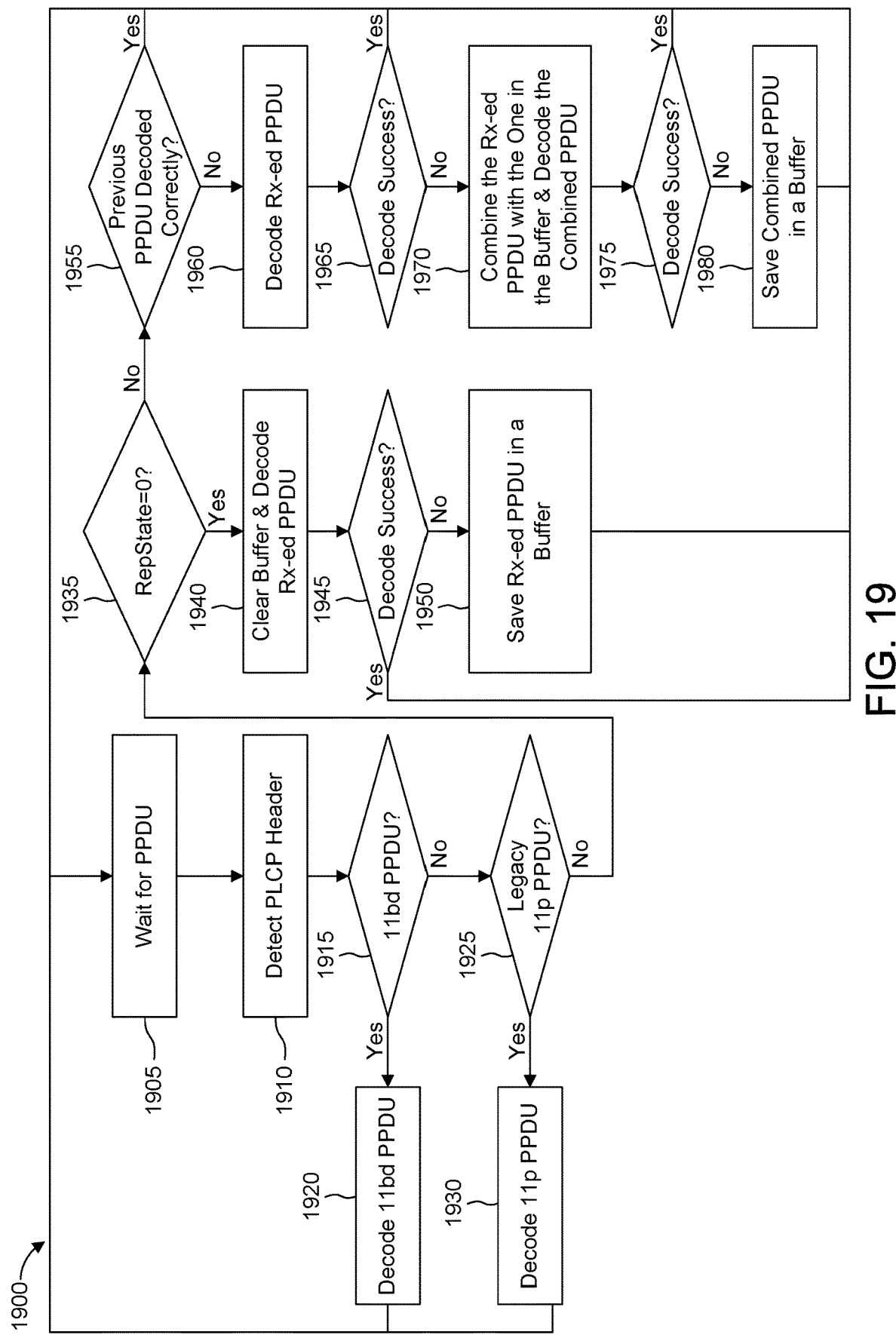
FIG. 19 is a diagram illustrating an example procedure for a receiver to combine and decode the repeating PPDUs based on RepState information.

FIG. 19 illustrates an example procedure 1900 for a receiver to combine and decode the repeating PPDUs based on RepState information, which may be used in combination of any of other embodiments described herein. For example, the receiver may wait for PPDU reception at step 1905 and detect a PLOP header of the PPDU at step 1910. The receiver may determine whether the received PPDU is 11bd PPDU or not at step 1915. If so, the receiver may decode 11bd PPDU at step 1920. If not, the receiver may determine whether the received PPDU is legacy 11p PPDU at step 1925. If so, the receiver may decode 11p PPDU at step 1930. If not, the receiver may determine whether RepState is 0 or not at step 1935. If the RepState is 0, the receiver may clear its buffer and decode the received PPDU at step 1940. If the decoding is not successful, the receiver may save the received PPDU in a buffer at step 1950. At step 1935, if the RepState is not 0, the receiver may determine whether the previous PPDU was decoded correctly at step 1955. If not, the receiver may decode the received PPDU at step 1960. If the received PPDU is not decoded successfully at step 1965, the receiver may combine the received PPDU with the one in the buffer and decode the combined PPDU at step 1970. If the combined PPDU is not successfully decoded at step 1975, the receiver may save the combined PPDU in a buffer 1980.

In this embodiment, after the receiver identifies that incoming PPDU is not IEEE 802.11bd and IEEE 802.11p PPDU without extra tones (i.e., no repetition), it may first detect if it is the first transmission of the repeating PPDUs (i.e., RepState=0) or not. If it is, the receiver may first clear the buffer and try to decode the data. If decoding is successful, the receiver will not decode the subsequent PPDU further. Otherwise, it will save the received PPDU in a buffer. If RepState=1 (i.e., the incoming PPDU is a retransmission) and the PPDU has not been decoded successfully, it may decode it first. If decoding fails, the receiver may combine the received PPDU with the one in the buffer and decode again. If the decoding is not successful, the receiver may save the combined PPDU in the buffer and wait for the next PPDU.

The extra tones described above may also be used to indicate if a PPDU transmitted is the last transmission of repeating PPDUs. The state of this one-bit information, denoted as isLastTx (i.e., is last transmission), may have two values for two of possible cases. For example, 0 means that this PPDU is not the last one and 1 means that this PPDU is the last one. When the sequence of repeating PPDUs is transmitted, each PPDU may carry this information, in which the last PPDU will have isLastTx=1 and all other PPDUs will have isLastRTx=0.

Figure 20:
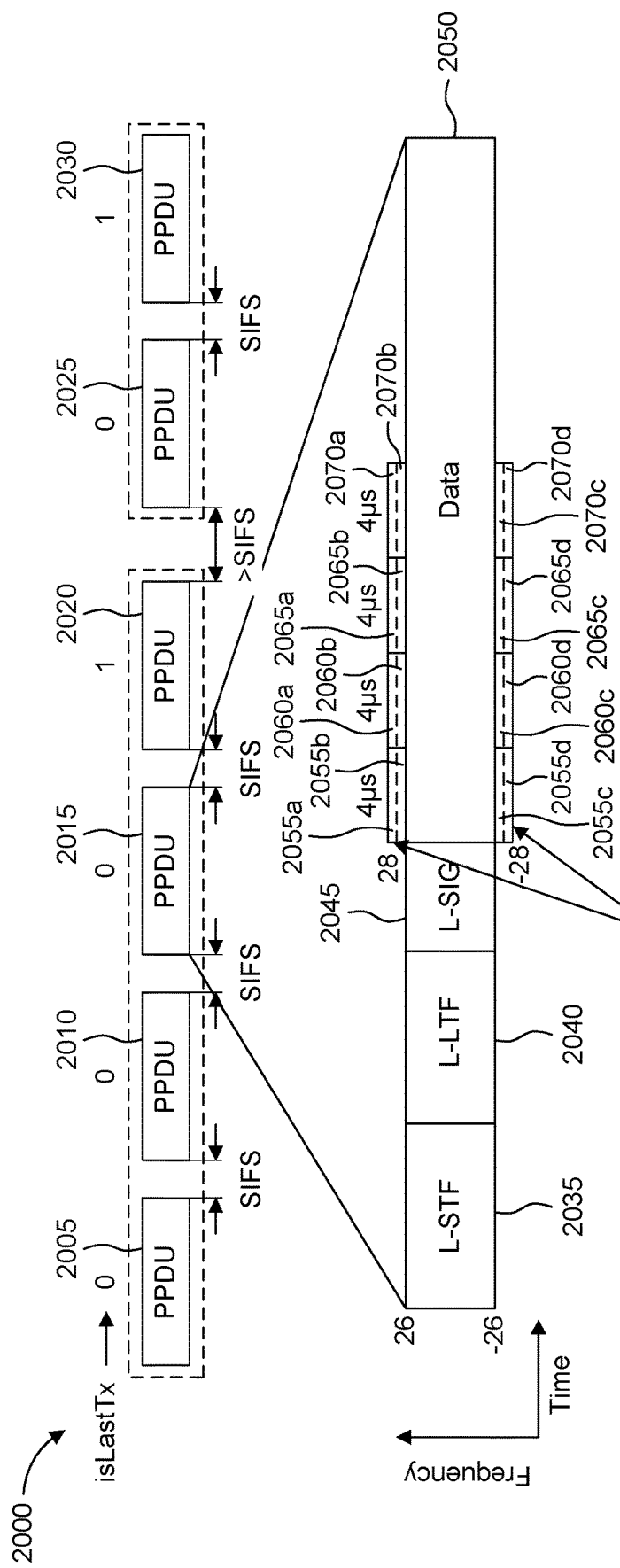
FIG. 20 is a diagram illustrating an example transmission of IEEE 802.11p PPDUs for IEEE 802.11bd devices using isLastTx to indicate the last PPDU of repeating PPDUs.

FIG. 20 illustrates an example transmission 2000 of IEEE 802.11p PPDUs for IEEE 802.11bd devices using isLastTx to indicate the last PPDU of repeating PPDUs, which may be used in combination of any of other embodiments described herein. As illustrated in FIG. 20, a receiver (e.g., future devices) may receive first repeated IEEE 802.11p PPDUs 2005, 2010, 2015, 2020 and second repeated IEEE 802.11p PPDUs 2025, 2030. Each PPDU (e.g., PPDU 2015) may comprise L-STF 2035, L-LTF 2040, L-SIG 2045, data symbols 2050 with extra tones 2055a-d, 2060a-d, 2065a-d, 2070a-d. Symbol patters in the extra tones (−28, −27, 27, 28) 2055a-d, 2060a-d, 2065a-d, 2070a-d may be used to carry sequences that indicate isLastTx as illustrated in FIG. 20. By doing so, the receiver may use this one-bit information to decode and combine the PPDU.

Figure 21:
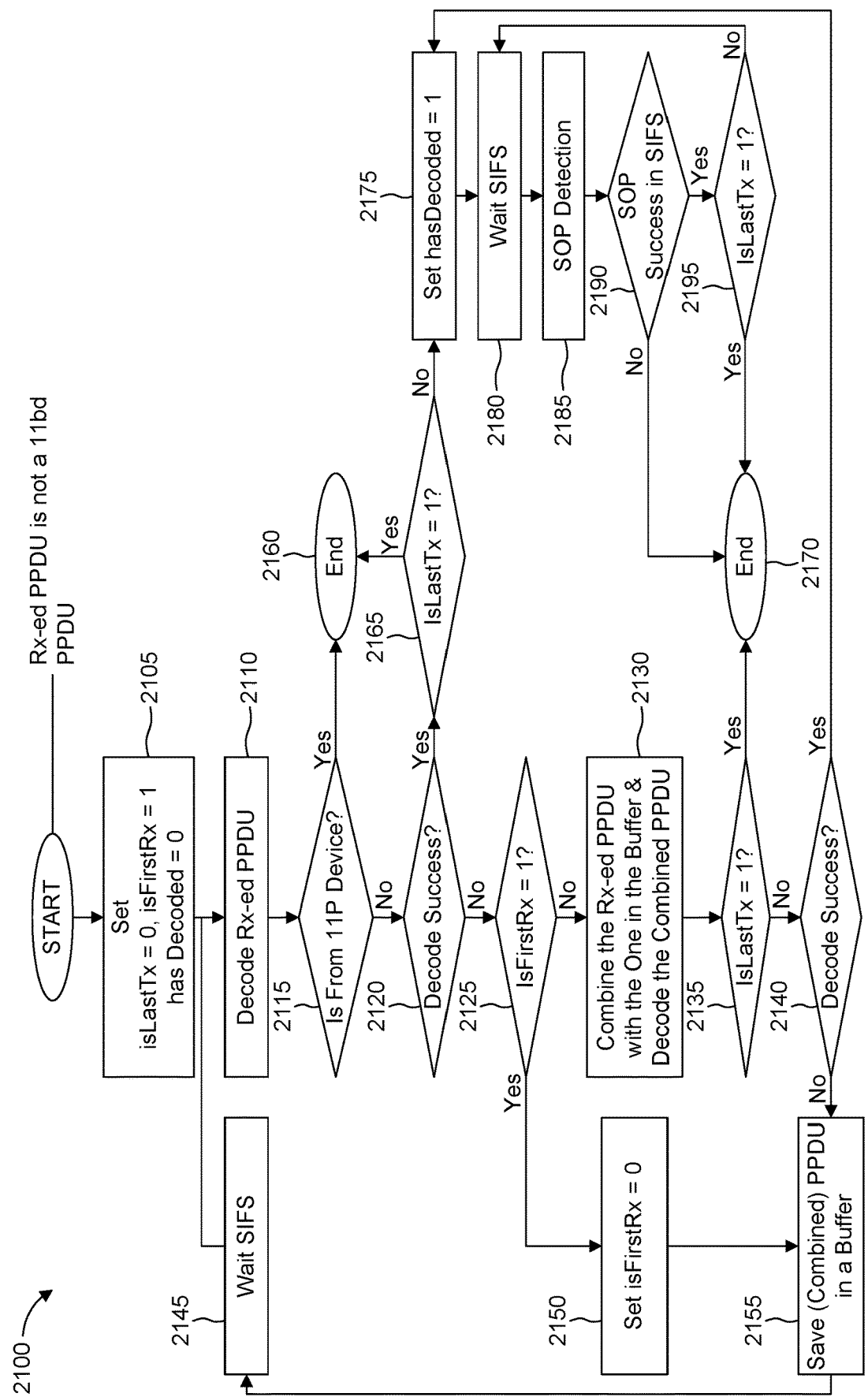
FIG. 21 is a diagram illustrating an example procedure for a receiver to combine and decode the repeating PPDUs based on isLastTx information.

FIG. 21 illustrates an example procedure 2100 for a receiver to combine and decode the repeating PPDUs based on isLastTx information, which may be used in combination of any of other embodiments described herein. After receiving a non IEEE 802.11bd PPDU, the receiver may set isLastTx=0, isFirstRx=1, and hasDecoded=0 at step 2105. The receiver may then decode the received PPDU at step 2110 and determine whether the received PPDU is from an IEEE 802.11p device or not at step 2115. If it is not received from the IEEE 802.11p device, the receiver may determine whether the received PPDU is decoded successfully at step 2120. If the received PPDU is not decoded successfully, the receiver may determine whether the received PPDU is the first one or not (i.e., isFirstRx=1) at step 2125. If the received PPDU is not the first PPDU, the receiver may combine the received PPDU with the one in the buffer and decode the combined PPDU at step 2130 and determine whether the received PPDU is the last one or not (i.e. isLastTx=1) at step 2135. If the received PPDU is the last one, the receiver may end the procedure 2100 at step 2170. If the received PPDU is not the last one, the receiver may decode the received PPDU and determine whether the received PPDU is decoded successfully at step 2140. If it is not successfully decoded, the receiver may save the PPDU in the buffer at step 2155 and wait SIFS for another PPDU at step 2145. If the received PPDU is successfully decoded, the receiver may set hasDecoded=1 at step 2175 and wait SIFS for another PPDU at step 2180. The receiver may then detect the start of packet (SOP) at step 2185 and determine whether SOP is detected successfully in SIFS at step 2190. If the SOP is successfully detected, the receiver may then determine whether the received PPDU is the last one or not (i.e., isLastTx=1) at step 2195. If it is the last transmission, the receiver may end the procedure 2100 at step 2170.

In this embodiment, after the receiver identifies that incoming PPDU is not a IEEE 802.11bd PPDU, it may first decode the data. If the decoding fails, the receiver may either save the PPDU in a buffer, assuming it is the first PPDU received in the sequence of repeating PPDUs, or combine the received PPDU with the one in the bugger and decode it again. If the decoding fails again, the receiver may keep the combined PPDU into buffer and decode it again. If the decoding fails again, the receiver may keep the combined PPDU into buffer and wait for the next PPDU. Otherwise, the receiver may declare the completion of the decoding and skip decoding the rest arriving PPDUs until the isLastTx=1. This embodiment may be simplified by combining all repeating PPDUs until the last one (isLastTx becomes 1) and then decoding the combined PPDU.

For these methods to work, the time distance between repeating PPDUs may be fixed. For example, the time distance between repeating PPDUs may be one SIFS. The time difference between the last PPDU of a sequence of repeating PPDUs and the first PPDU of another sequence of repeating PPDUs may be larger than SIFs to avoid misdetection of the first or last PPDU.

In one embodiment, repetition transmission may be utilized. The first transmission may be carried by legacy PPDU without any change so that legacy devices are not impacted. The retransmissions may be carried by legacy PPDU with extra tones. In one embodiment, a predefined/predetermined modulated sequence may be carried by the extra tones. The detection of the extra tones or detection of the sequence on the extra tones may indicate that the PPDU may carry a retransmission of previous PPDU. In another embodiment, one of the two or more predefined/predetermined modulated sequences may be carried in the extra tones of the PPDU. Each sequence may indicate some information. For example, sequence 1 may indicate that the PPDU may carry a retransmission of previous PPDU. Sequence 2 may indicate that the PPDU may carry the last retransmission of the repetition transmission sequence.

The receiving STA procedure for a future device (non-legacy) is as follows. First, the STA may receive a legacy PPDU. If the STA is configured to successfully decode the PPDU and/or the PPDU carries a broadcast/multicast MAC frame, the STA may pass the frame to the higher layer and start a repetition transmission timer. If the STA may receive a legacy PPDU with extra tones used xIFS time after the first transmission and/or the repetition transmission timer is not expired, the STA may deduce that a repetition transmission may occur and the STA may go to a sleep or micro-sleep mode until the end of the PPDU. The STA may set the time to invalid (or an original value) after the processing of the repetition PPDU. If the timer expired, the STA may set the timer to invalid (or an original value).

If the STA may not successfully decode the PPDU, the STA may save the received signal in a buffer and start a repetition transmission timer. If the STA is configured to receive a legacy PPDU with extra tones used and/or the repetition timer is not expired, the STA may know a repetition transmission may happen and the STA may combine the received signal with the signal saved in the buffer. In one embodiment, the STA may perform individual PPDU detection first. If failed, the STA may combine the received signal with the previously saved signal when repetition indication is detected. The STA may set the timer to invalid (or an original value) after the processing of the repetition PPDU. If the timer expired and the STA is not configured to receive a repetition PPDU or the STA is not configured to successfully decode the frame, the STA may release the buffer and set the timer to invalid (or an original value).

Tables 5 and 6 summarize the behavior of the future device (e.g., IEEE 802.11bd). In Table 5, it is assumed that the transmitted PPDU is a legacy PPDU with extra tones. In Table 6, it is assumed that the transmitted PPDU is a legacy PPDU without extra tones.

TABLE 5

| SIG detection | Extra tone detection | 11 bd or future device behavior |
|---|---|---|
| Yes | Yes | May perform legacy PPDU detection first. May decode the data frame with repetition combining |
| Yes | No (miss detection) | Decode the data frame without repetition combining. If failed may buffer the received signal |
| No | Yes | Option 1: Discard the packet; Option 2: Try combining (assuming in the first transmission SIG was detected and repetition transmissions are continuously transmitted with xIFS separation) |
| No | No | Discard the packet |

TABLE 6

| SIG detection | Extra tone detection | 11 bd or future device behavior |
|---|---|---|
| Yes | Not detected extra tones | May perform legacy PPDU detection first. May buffer the received signal when data detection failed. |
| Yes | Detected extra tones (false alarm) | May perform legacy PPDU detection first. May decode the data frame with repetition combining (combine with wrong PPDU) |
| No | Yes | Option 1: Discard the packet; Option 2: Try combining if the previously save packet was transmitted within certain time period. (a time threshold may be predefined or predetermined) |
| No | No | Discard the packet |

In one embodiment, the transmit power for the 52 legacy tones in L-LTF, L-SIG, and 4 extra tones may be configurable. In one example, different power levels between 52 legacy tones and four extra tones may be used. In another example, different power levels for extra tones between L-SIG, RL-SIG (if present) and other fields (e.g., data) where the extra tones are may be used.

Figure 22:
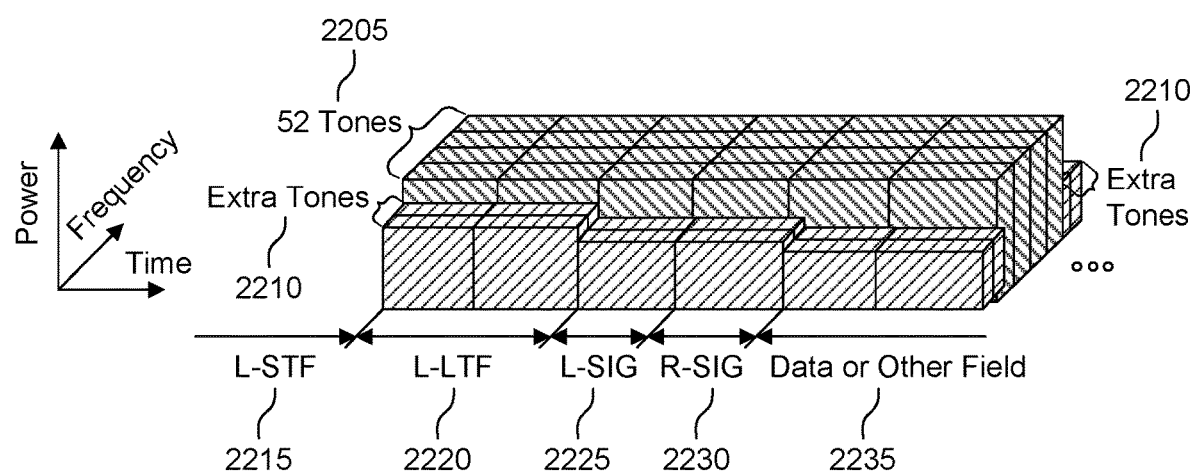
FIG. 22 is a diagram illustrating an example extra tones with power allocation in different fields.

FIG. 22 illustrates an example extra tones 2200 with power allocation in different fields, which may be used in combination of any of other embodiments described herein. As illustrated in FIG. 22, PPDU may comprise L-STF symbol 2215, L-LTF symbol 2222, L-SIG symbol 2225, R-SIG symbol 2230, and data symbols 2235. Each of L-STF symbol 2215, L-LTF symbol 2220, L-SIG symbol 2225, R-SIG symbol 2230, and data symbols 2235 may include 52 tones 2205 and four extra tones 2210 with different power allocation. The different power allocation may help trade off the quality of the repetition detection, channel estimation quality, detection of the SIG signal, or the like.

In one embodiment, the same power may be allocated to the extra tones. The extra detection may use the sequence. In one example, the ON and OFF pattern used for extra tones may be used to indicate information. Power ON may refer to the same transmit power as the legacy tones (i.e., 52 legacy tones in the example). Power OFF may refer to 0 transmit power. In one example, extra tones on LTF symbols may use power 1; extra tones on SIG symbols may use power 2; and extra tones on data symbols may use power 3.

In general, all resource elements in those extra tones that may be used for repetition signaling or other type of signaling may have different power levels, including zero. The power allocation pattern may also be used for coding of the information in the signal.

Embodiments disclosed herein may help resolve the ambiguity at an IEEE 802.11bd receiver when determining whether the extra tones are present at a received IEEE 802.11p PPDU. When an IEEE 802.11bd receiver receives an IEEE 802.11p PPDU, it may need to determine whether the extra tones carry information or simply empty tones with noise. Without this knowledge, the IEEE 802.11bd receiver may take the noise on the empty tones as useful information (i.e. false alarm) or may ignore the useful information on the extra tones as noise (i.e. missed detection).

Figure 23:
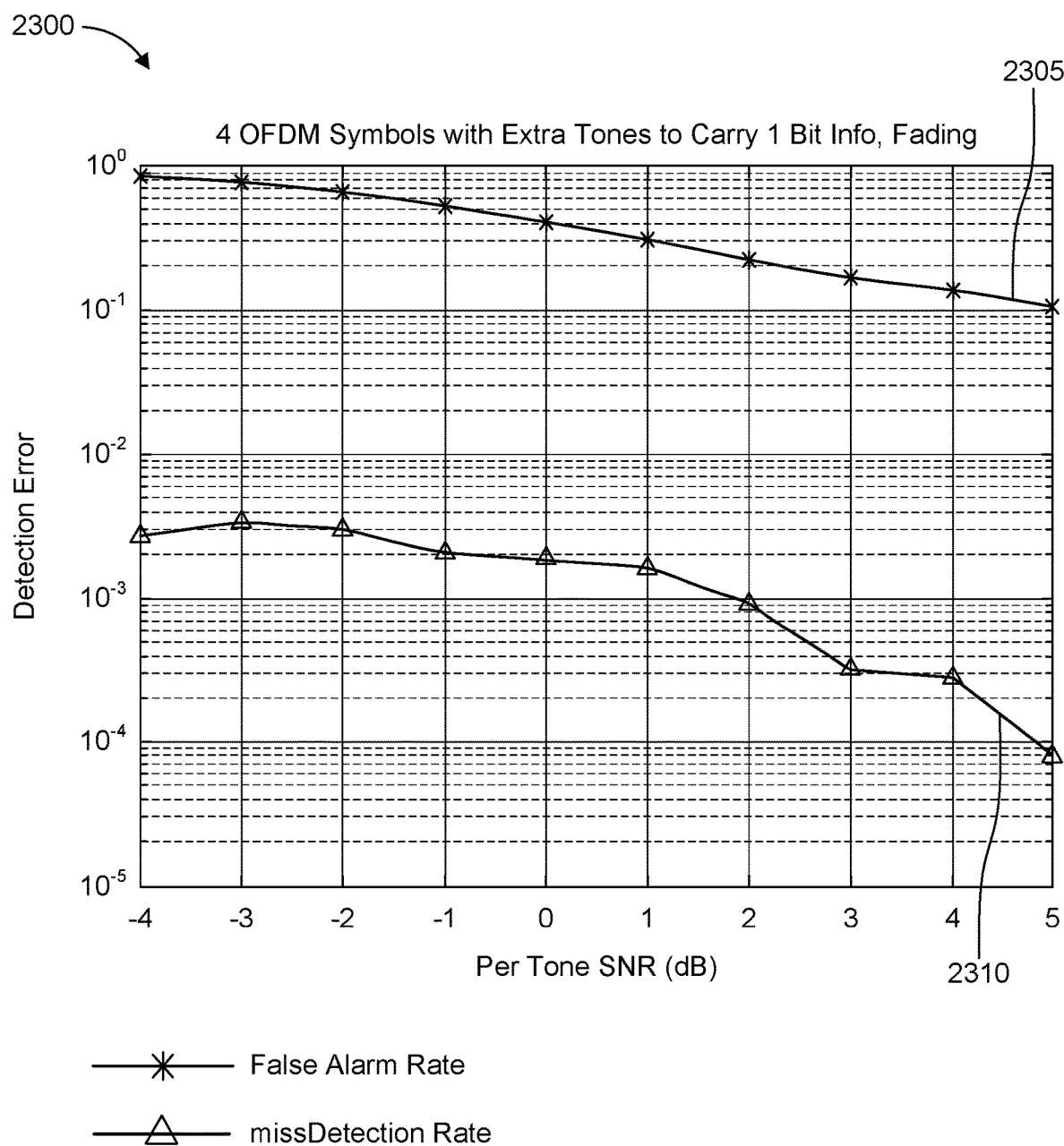
FIG. 23 is a diagram illustrating example detection errors per tone SNR with energy on extra tones.
Figure 24:
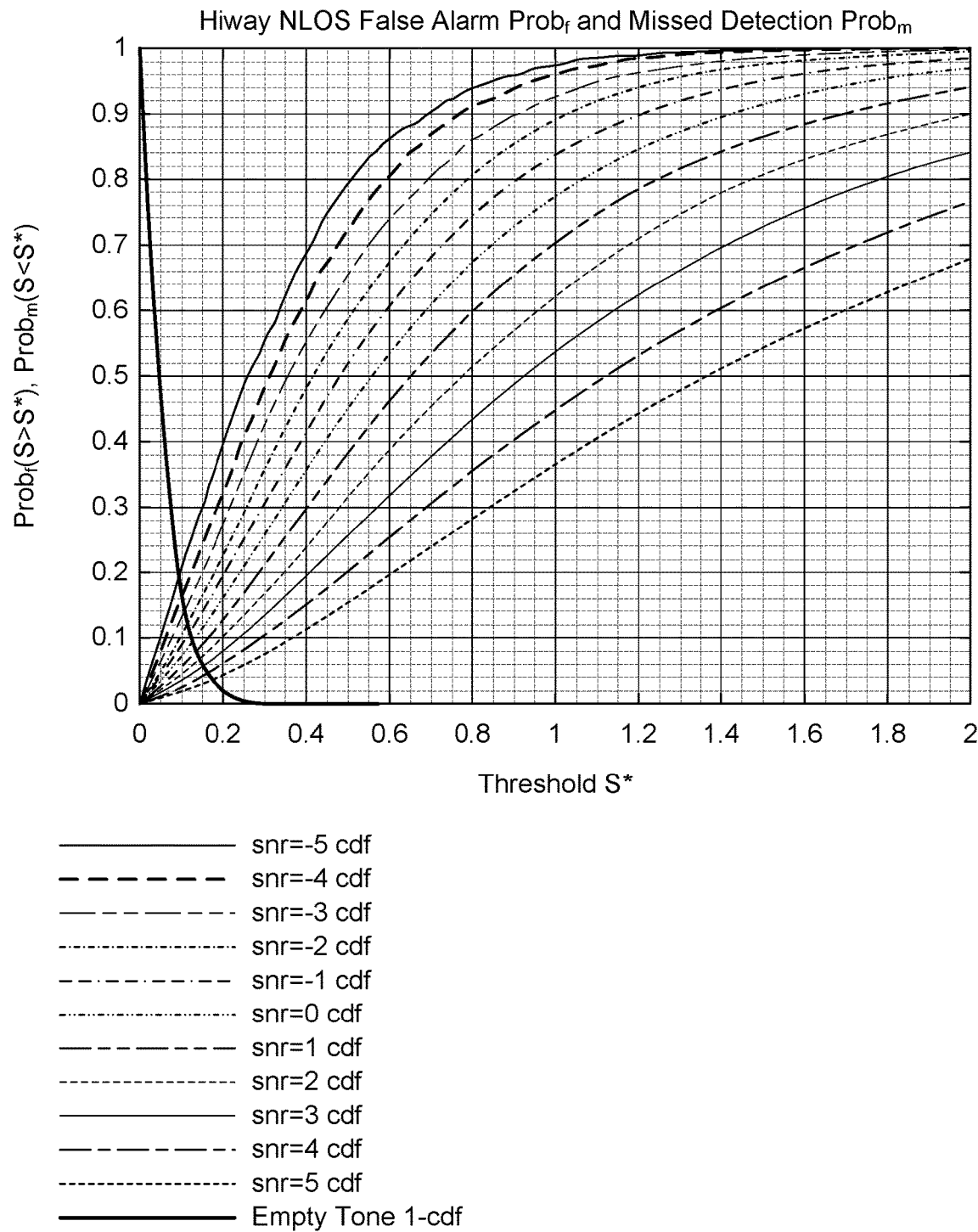
FIG. 24 is a diagram illustrating that a low threshold S* results in a high Probf and a high threshold S* results in a high Probm.

FIGS. 23 and 24 illustrate thresholding mechanisms for a receiver to make such a determination.

FIG. 23 illustrates example detection errors per tone SNR with energy on extra tones. By keeping the threshold low, the missed detection rate 2310 is low. However, the false alarm rate 2305 is significantly higher. For example, the IEEE 802.11bd receiver may take the received PPDU as a repetition of a previous PPDU, while the received PPDU has no transmitted energy on the extra tones (i.e., the PPDU is not a repetition).

In FIGS. 13-16, a correlation between sequence on different tones are used to determine whether the information bit is 1 or 0. A threshold S* is compared with the absolute value of the correlation. If the value is below the S* threshold, the receiver determines the extra tones are empty and only carry noise. If the value is above the S* threshold, the receiver uses the correlation to determine whether the bit is 1 or 0.

FIG. 24 illustrates a graph 2400 showing that a low threshold S* results in a high Probf (i.e. thick curve) and a high threshold S* results in a high Probm (i.e. thin curves). Neither are desirable.

When IEEE 802.11p PPDUs are transmitted back to back by an IEEE 802.11bd transmitter, the IFS between the PPDUs may be set to a value not used by the legacy devices, i.e., a value that is not SIFS, DIFS, PIFS, AIFS, and duration according to Equation 7.

$$\text{DIFS(or AIFS)} + n*\text{SloTime}, n \geq 0 \qquad \text{Equation 7}$$

A receiver (e.g., an IEEE 802.11bd device) may base on the IFS before or after the current IEEE 802.11p PPDU equal to the value above, to determine the current PPDU has extra tones carrying information.

Figure 25:
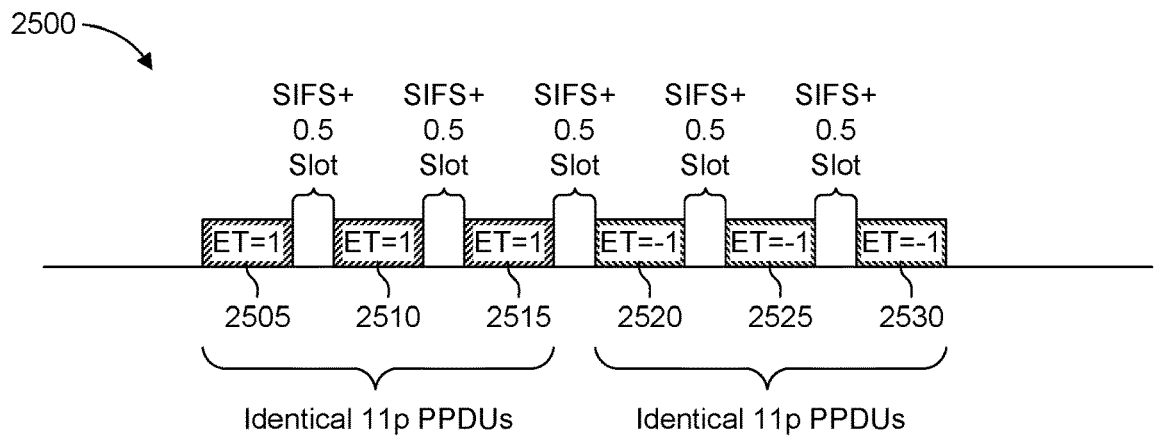
FIG. 25 is a diagram illustrating signaling the presence of extra tones.

FIG. 25 illustrates an example 2500 of signaling the presence of the extra tones using equation 8.

$$\text{IFS} = \text{SIFS} + 0.5*\text{SloTime} \qquad \text{Equation 8}$$

As illustrated in FIG. 25, a receiver may receive IEEE 802.11p PPDUs 2505, 2510, 2515 with extra tones indicating 1 (i.e., ET=1) and IEEE 802.11p PPDUs 2520, 2525, 2530 with extra tones indicating −1 (i.e., ET=−1). These PPDUs 2505, 2510, 2515, 2520, 2525, 2530 may be received IFS time before or after.

The PPDUs of the same color carry identical information (e.g., in the center 52 tones) and may be combined by an IEEE 802.11bd receiver for decoding.

When an IEEE 802.11bd receiver receives a PPDU and the IFS before or after the PPDU is equal to the special value, the receiver may determine extra tones are present. The receiver may use the methods described above to extract the information carried in the extra tones.

The information carried in the extra tones may be a signature of PPDUs of the same content (e.g., color), such that the receiver will not combine the energy/soft bits from PPDUs with different signatures. FIG. 25 illustrates an example that the signature is 1 bit (+1, −1).

Figure 26:
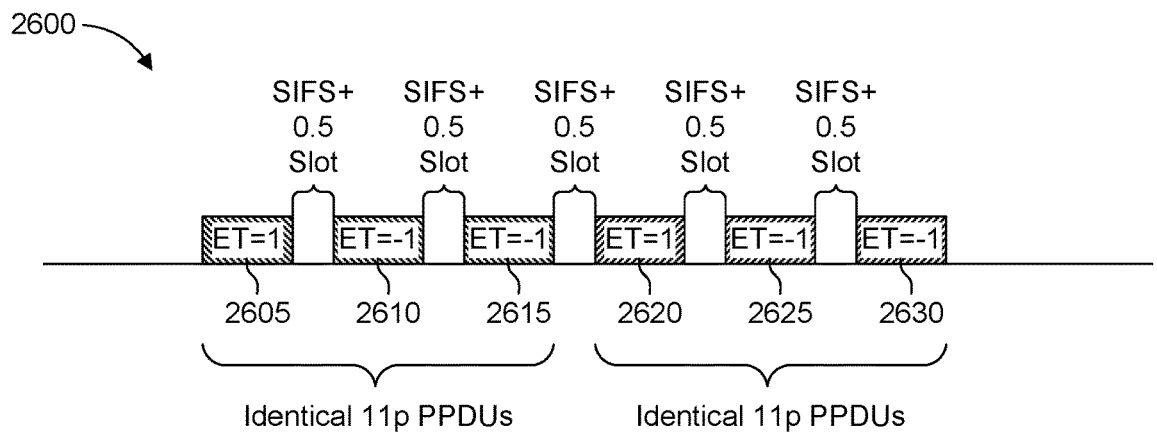
FIG. 26 is a diagram illustrating signaling new transmission and retransmissions in repetition transmission sequences.

FIG. 26 illustrates signaling new transmission and retransmissions in repetition transmission sequences, which may be used in combination of any of other embodiments described herein. As illustrated in FIG. 26, a receiver may receive IEEE 802.11p PPDUs 2605, 2610, 2615 with extra tones. The extra tone of the first PPDU 2605 may be 1 (i.e. ET=1) but other extra tones of repeated PPDUs 2610, 2615 may be −1 (i.e., ET=−1). The receiver may also receive IEEE 802.11p PPDUs 2620, 2625, 2630 with extra tones. The extra tone of the fourth PPDU 2620 may be 1 (i.e. ET=1) but other extra tones of repeated PPDUs 2610, 2615 after the PPDU 2620 may be −1 (i.e., ET=−1). The PPDUs 2605, 2610, 2615 2640, 2625, 2630 may be received IFS time before or after. In this embodiment, the first transmission may always be with ET=1 and retransmissions may always be with ET=−1.

A IEEE 802.11bd preamble may be designed to be more robust or have a longer range than IEEE 802.11p PPDUs. Such preamble may only be understood by IEEE 802.11bd STAs. The preamble, or the IEEE 802.11bd PPDU itself may be used to indicate duration in which repeated IEEE 802.11p PPDU are transmitted.

The data field of the IEEE 802.11bd PPDU may carry additional coded bits, or identical information as the following IEEE 802.11p PPDUs for combining. The presence/configuration of such data field may be signaled by the IEEE 802.11bd preamble.

A receiver (e.g., an IEEE 802.11bd device) upon receiving such information, may assume the extra tones are present in the IEEE 802.11p PPDUs transmitted in the indicated duration. The extra tones of each PPDU may carry additional information to help the receiver to combine the energy/soft bits of a group of identical IEEE 802.11p PPDUs.

Figure 27:
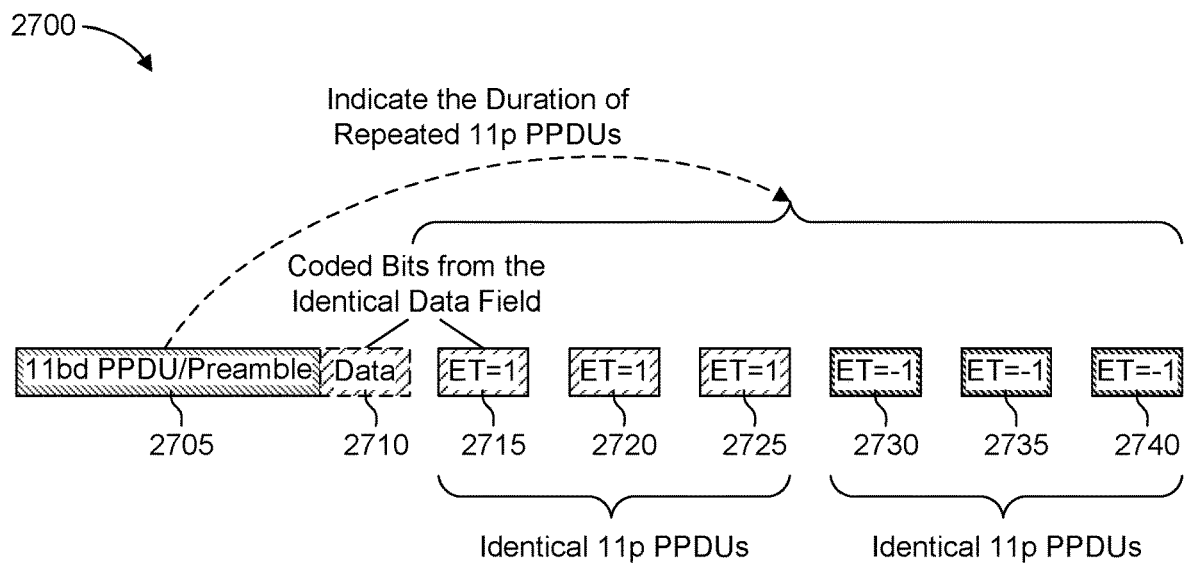
FIG. 27 is a diagram illustrating an example indication of duration of IEEE 802.11p PPDU transmissions by an IEEE 802.11bd transmitter.

FIG. 27 illustrates an example indication of duration of IEEE 802.11p PPDU transmissions by an IEEE 802.11bd transmitter, which may be used in combination of any of other embodiments described herein. As illustrated in FIG. 27, the preamble/IEEE 802.11bd PPDU 2705 may indicate duration of repeated transmissions of the IEEE 802.11p PPDUs 2715, 2720, 2727, 2730, 2735, 2740. The data field 2710 may carry additional coded bits extracted from the data field of the IEEE 802.11p PPDUs 2715, 2720, 2727, 2730, 2735, 2740.

The duration indicated may be the count of the IEEE 802.11p PPDUs within the duration.

Figure 28:
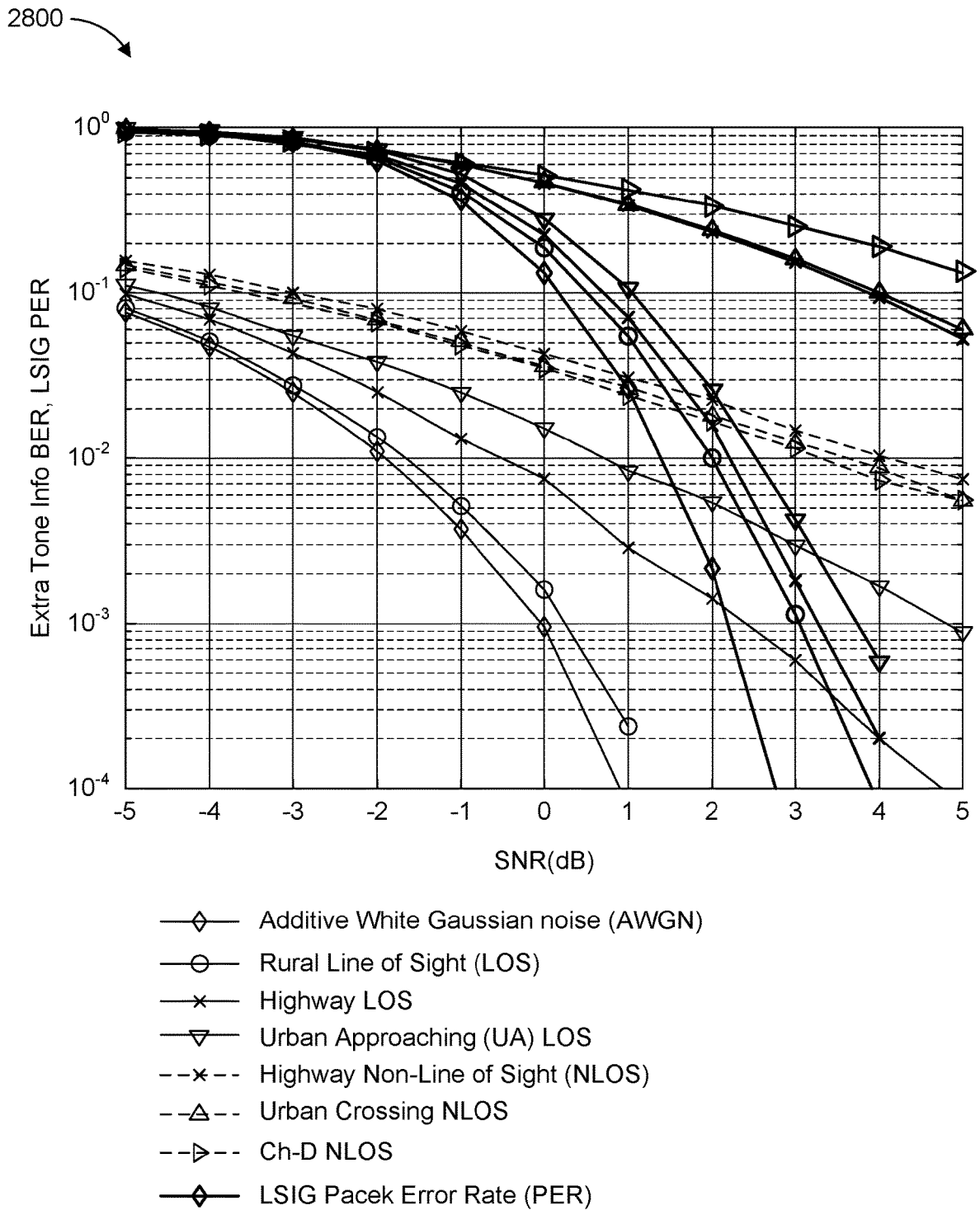
FIG. 28 is a diagram illustrating extra tone information bit error rate (BER) and L-SIG packet error rate (PER)

FIG. 28 is a graph 2800 illustrating extra tone information bit error rate (BER) and L-SIG packet error rate (PER). FIG. 28 shows that the information carried in the extra tones is more reliable than L-SIG in low SNR. In the low SNR operation, assuming the L-STF of IEEE 802.11p PPDUs are detected, the receiver knowing the presence of the extra tones may use the information (such as a signature) extracted from the extra tones to identify the PPDUs of the same color to combine the energy/soft bits of L-SIG symbol for decoding the L-SIG information. Alternatively or additionally, the L-SIG information may be duplicated in the IEEE 802.11bd (e.g., extended range) preamble or PPDU for reliability.

A short IEEE 802.11p frame may be more robust than longer IEEE 802.11p frames of the same or higher MCS. A short IEEE 802.11p frame with a special setting/configuration may be used to signal to an IEEE 802.11bd receiver the duration in which repeated IEEE 802.11p PPDU are transmitted.

In some embodiments, a short IEEE 802.11p frame may be a NAV setting frame. For example, the NAV setting frame may be a CTA to self-frame. The NAV (Duration field in MAC header) may indicate a duration in which repeated IEEE 802.11p PPDU are transmitted after the short frame. For example, the scrambler initialization (or the subset/all of the SERVICE field) may indicate the duration in which repeated IEEE 802.11p PPDU are transmitted after the short frame. The duration indicated may be the count of the IEEE 802.11p PPDUs within the duration.

In one embodiment, the short IEEE 802.11p frame may have a special TA/RA. For example, the special TA/RA MAC address may have an individual/group bit set to 1.

Figure 29:
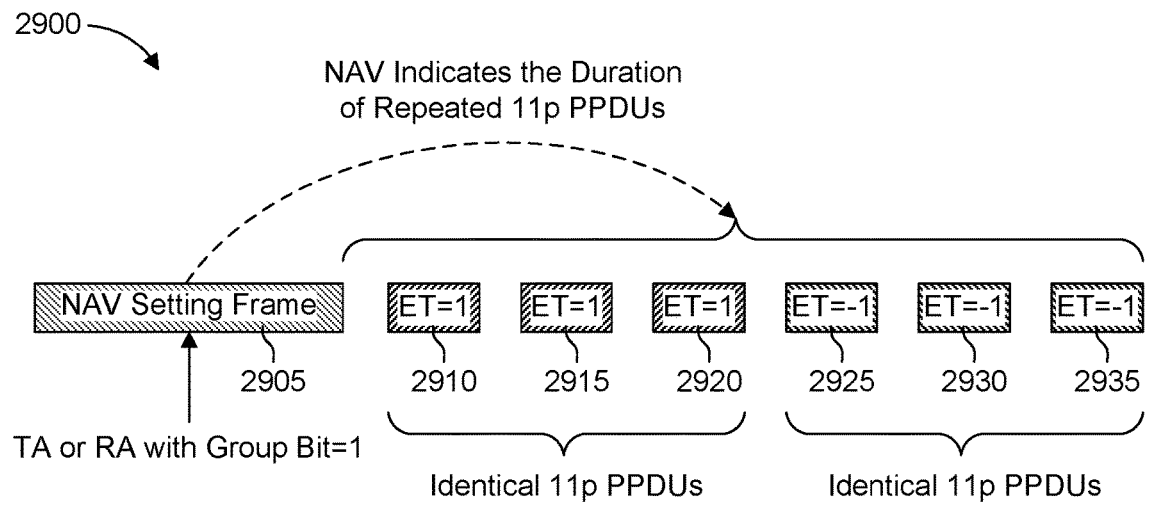
FIG. 29 is a diagram illustrating another example indication of duration of IEEE 802.11p PPDU transmissions by an IEEE 802.11bd transmitter.

FIG. 29 illustrates another example indication of duration of IEEE 802.11p PPDU transmissions by an IEEE 802.11bd transmitter, which may be used in combination of any of other embodiments described herein. As illustrated in FIG. 29, the NAV setting frame 2905 may include TA and/or RA field with a group bit=1 and indicate the duration of repeated IEEE 802.11p PPDUs 2910, 2915, 2920, 2925, 2930, 2935 transmitted after the NAV setting frame 2905. The information carried in the extra tones in this example is an 1 bit signature of identical IEEE 802.11p PPDUs. The duration indicated may be the count of IEEE 802.11p PPDUs within the duration.

Embodiments describing how to use extra tones to carry coded information are described herein. The same binary convolution codes (BCC) encoder/decoder for L-SIG may be used to encode/decode information carried in the extra tones.

Figure 30:
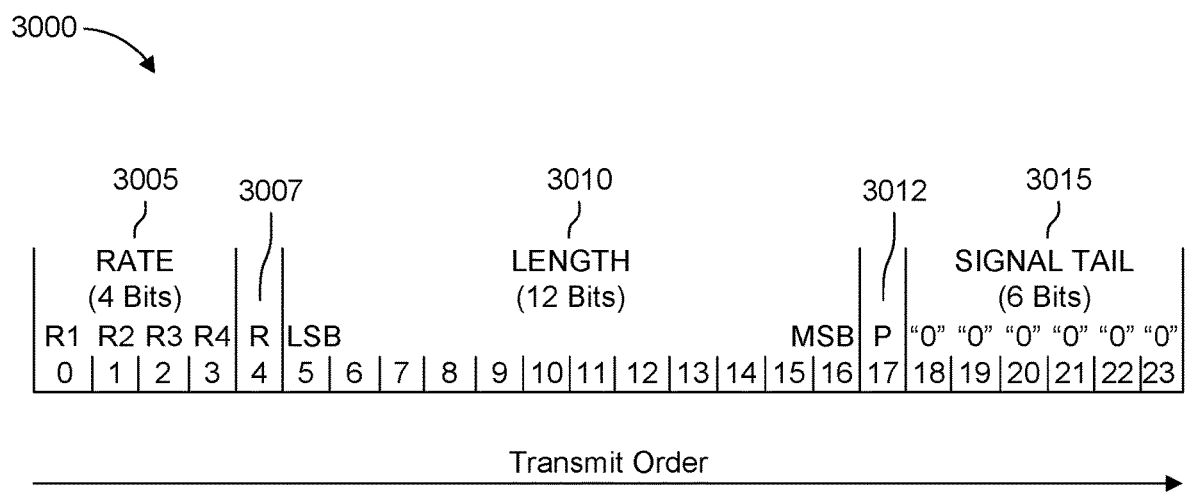
FIG. 30 is a diagram illustrating an example legacy-signal (L-SIG) field.

FIG. 30 illustrates an example legacy-signal (L-SIG) field 3000 that carries coded information, which may be used in combination of any of other embodiments described herein. As illustrated in FIG. 30, the L-SIG may include a rate 3005 with 4 bits, R 3007 with one bit, length with 12 bits, P 3012 with one bit and a signal tail with 6 bits. The coded information is the input to the ½ BCC encoder.

Figure 31:
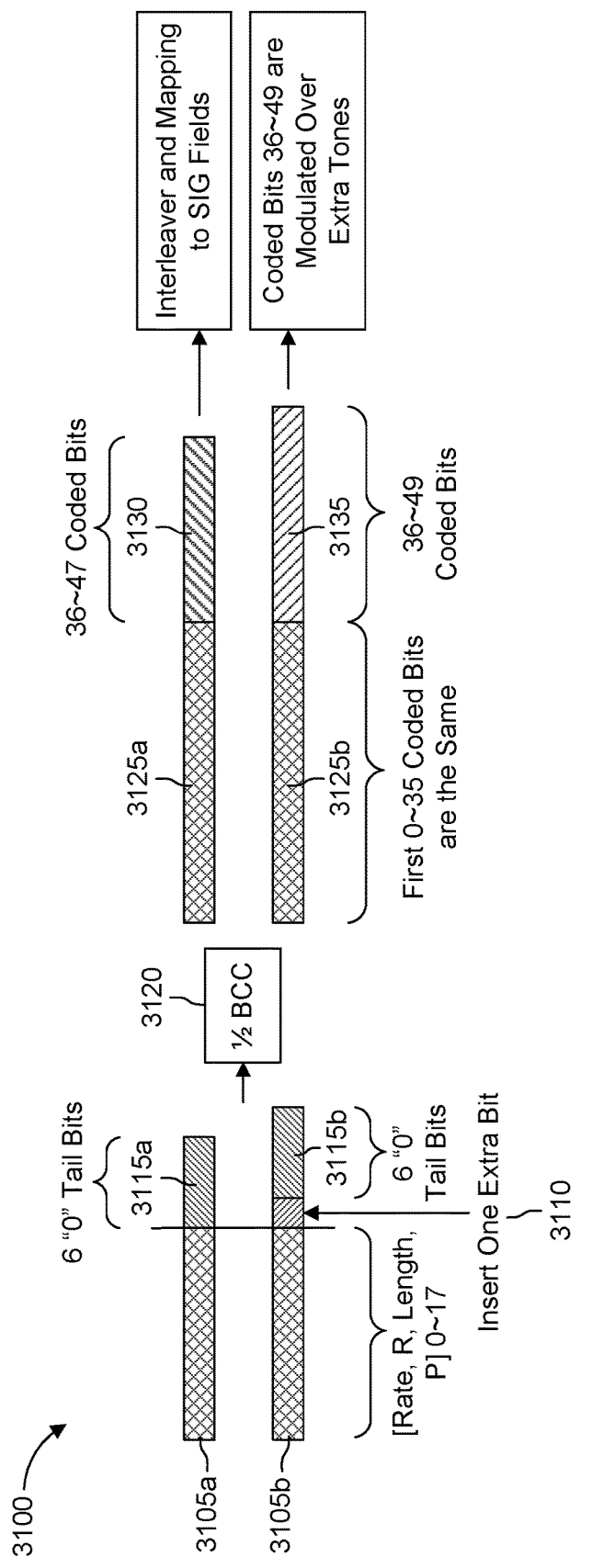
FIG. 31 is a diagram illustrating an example additional bit encoding carried in extra tones.

FIG. 31 illustrates an example 3100 of encoding additional bits to be carried in the extra tones, which may be used in combination of any of other embodiments described herein. As illustrated in FIG. 31, the L-SIG source bit comprising a rate, R, length, P bits 3105a and tail bits 3115a may be the input to the ½ BCC 3120 and result in encoded bits comprising 0~35 coded bits 3125a and 36~47 coded bits 3130. The additional source bits 3110 may be appended to the bit 17 (P) of the L-SIG source bits (i.e. rate, R, length, P bits 3105b) before the six "0" tail bits 3115b. The L-SIG source bits 3105b, 3115b with the additional source bit 3110 may be the input to the ½ BCC 3120 and result in encoded bits comprising 0~35 coded bits 3125b and 36~49 coded bits 3135b. The 36~49 coded bits 3135b may be modulated over the additional source bit 3110.

In FIG. 30, the encoding are shown as two parallel processes (i.e., original L-SIG encoding and new encoding), but can be simplified into one by remembering the last registered state of the original L-SIG encoding before the tail bits are shifted in. The output coded bits of the two processes have three groups: the coded bits 3125a, 3125b before tail bits 3115a, 3115b shifted into the registers in the original L-SIG encoding, the coded bits 3130 after the tail bits 3115a shifted into the registers in the original L-SIG encoding, and the coded bits 3135 after the additional source bits 3110 or tail bits 3115b shifted in the register in the new encoding process. The coded bits 3125a, 3125b, 3130 may be carried in the center 52 tones and can be understood by the legacy STAs. The coded bits 3135 may be carried in the extra tones which may be the edge tones in L-LTF, L-SIG, or data symbols. The IEEE 802.11bd receiver may use coded bits 3125a, 3125b, 3135 to decode the addition source bits 3110.

In one embodiment, before decoding the additional source bits 3110 and after verifying the accuracy of the L-SIG, the soft bits demapped from the coded bits 3125a, 3125b can be modified to maximum or minimum values that generate the correct L-SIG, before sending the soft bits to the decoder, for increasing the likelihood of correctly decoding the additional bits.

Alternatively or additionally, the additional source bits 3110 may replace a portion of the original L-SIG source bits 3105a, 3105b before appending tail bits 3115a, 3115b. This may keep the traceback length the same as the L-SIG BCC decoder.

Alternatively or additionally, the additional source bits 3110 may not be appended to any bits from L-SIG. The BCC encoder is initialized as all 0 before additional bits and tail bits are shifted into the registers.

Embodiments for version indication are described herein. A CRC field may be used in PHY header for error detection. A masking may be applied on top of the CRC field to indicate additional information.

Figure 32:
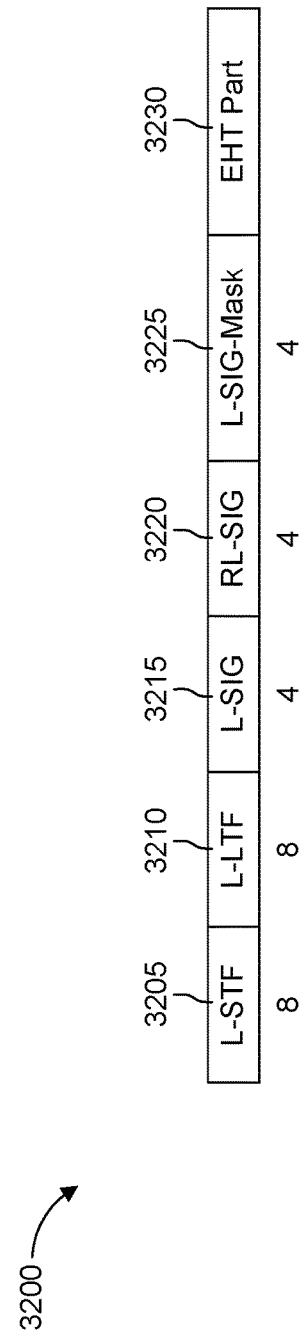
FIG. 32 is a diagram illustrating an example extremely high throughput (EHT) preamble.

FIG. 32 illustrates an example extremely high throughput (EHT) preamble 3200, which may be used in combination of any of other embodiments described herein. As illustrated in FIG. 32, the EHT preamble 3200 may comprise L-STF 3205, L-LTF 3210, L-SIG 3215, RL-SIG 3220, L-SIG-Mask 3225, and EHT field 3230. The L-SIG-Mask field 3225 may be used for auto detection and version indication. In one embodiment, the L-SIG Mask field 3225 may be generated using the following method. First, information bits carried in the L-SIG field 3215 may be used to generate 6-bit CRC. Next, the CRC bits may be scrambled with a predefined 6-bit version indication, denoted by 6-bit masked CRC. The 6-bit masked CRC with 6 tail bits may be encoded using rate ½ BCC codes, and BPSK modulation. This may result in 24 BPSK modulated symbols. The 24 BPSK modulated symbols may be mapped to odd or even subcarriers. Next, IFFT may be performed. In this way, the time domain waveform may be repeated.

A legacy STA may not decode L-SIG-Mask 3225 successfully, and it may not continue the detection. A future device may know the coding/modulation procedure of the L-SIG-Mask 3225 and may be able to detect it successfully. It may detect the 6-bit version indication and notice the IEEE 802.11 standard version for the PPDU.

Although detailed number bits are provided in the embodiments described above, the numbers may be changed. The basic procedure, such as version indication bits, may be scrambled and the CRC bits may remain the same.

Instead of the aforementioned masking to CRC generated from L-SIG information bits, masking may be applied to the CRC field of legacy (e.g., IEEE 802.11ax) with different sequences for different PPDU versions. In one embodiment, the version indication masking may be applied to the CRC field of new signaling field, such as EHT-SIG field(s).

Version indication may comprise two steps. The first step may comprise indicating that the PPDU is an IEEE 802.11ax+ PPDU (i.e., not IEEE 802.11ax or older version). The second step may comprise indicating the specific version after IEEE 802.11ax.

The first step may comprise one or a combination of the following: (1) transmitting some non-zero energy symbols in tones (−28, −27, 27, 28) in L-LTF and L-SIG filed, which have zeros in the legacy (i.e. IEEE 802.11ax and earlier) PPDUs; (2) transmitting RL-SIG with QBPSK modulation (i.e., rotated BPSK) and using BPSK for the OFDM symbol after it, where the symbol may be the SIG field for an IEEE 802.11 ax+ PPDU; and (3) assuming the first OFDM after L-SIG is not RL-SIG, but one of two SIG fields for IEEE 802.11ax+ PPDU, such as EHT-SIG-A1 and EHT-SIG-A2, using QBPSK for EHT-SIG-A1 and using BPSK for EHT-SIG-A2.

For the second step, a method may be used based on frequency domain sequence detection or coded detection. For a frequency domain sequence detection method, a set of orthogonal sequences may be chosen, one for each PPDU version, at input of IDFT for the time domain symbol after L-SIG or RL-SIG. The symbols in tone (−28, −27, 27, 28) in L-LTF and L-SIG may also be used to increase the detection reliability.

For coded detection, one of the legacy header modification methods described above may be used. Alternatively or additionally, a new SIG field with information bits explicitly defined for PPDU version (i.e., IEEE 802.11ax+) may be explicitly defined, followed by CRC and tail bits. To avoid a potential false alarm two IEEE 802.11n packet, the first 7 bits of the new SIG field may not be the same as the ones in the IEEE 802.11n MCS table. There are 76 different values in the IEEE 802.11n MCS table.

Figure 33:
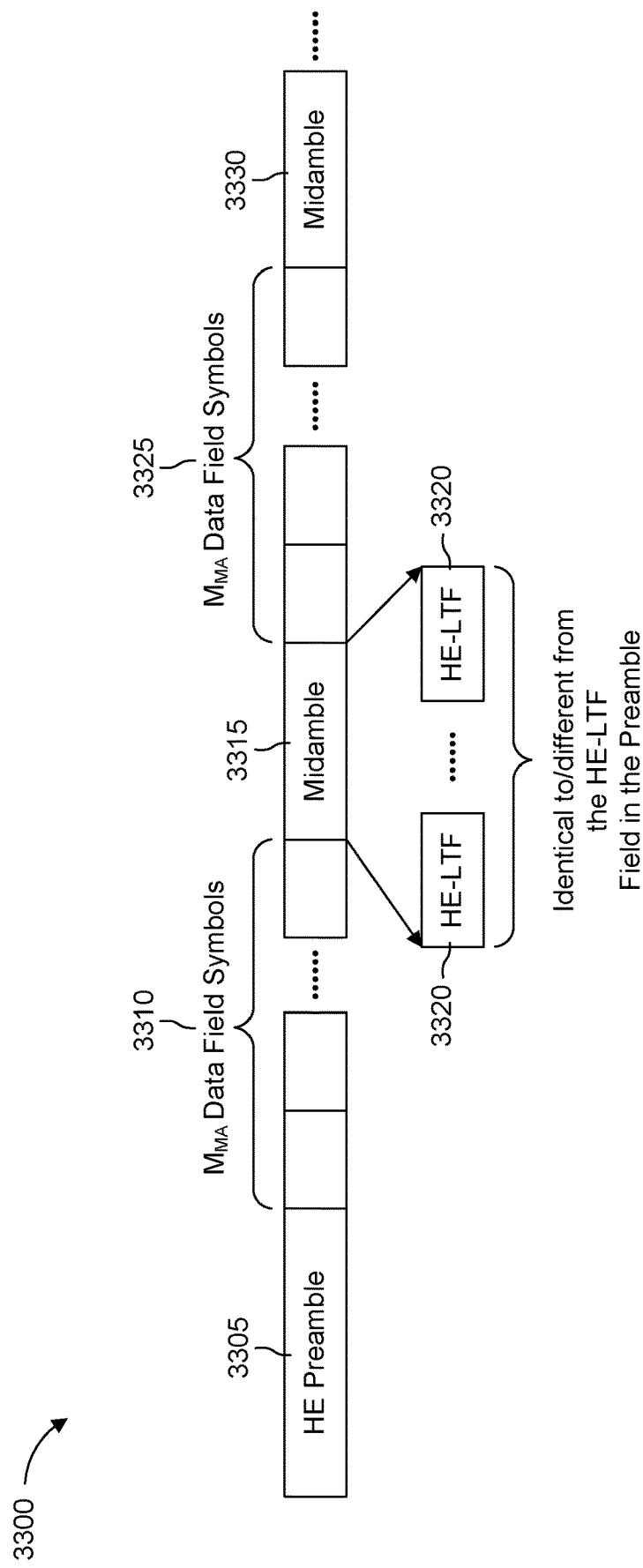
FIG. 33 is a diagram illustrating an example high efficiency physical layer convergence procedure protocol data unit (HE PPDU) format with a midamble.

FIG. 33 illustrates an example high efficiency physical layer convergence procedure protocol data unit (HE PPDU) format 3300 with a midamble, which may be used in combination of any of other embodiments described herein. As illustrated in FIG. 33, a HE PPDU may include HE preamble 3305, first $M_{MA}$ Data field symbols 3310, a first midamble 3315, second $M_{MA}$ Data field symbols 3325, a second midamble 3330, and the like. Midambles 3315, 3330 may be used by the receiver to compensate the channel estimation if the channel estimation is varying fast in channels with high Doppler. Midambles may be present in the data field of HE PPDU every $M_{MA}$ Data field symbols 3310, 3325 where $M_{MA}$ is a number such as 10 or 20 and may be adapted based on the channel estimation in the receivers side. For example, $M_{MA}$ Data field symbols 3310, 3325 may be 10 or 20 data symbols before/after a midamble, or between midambles. Midambles 3315, 3330 may include, but are not limited to multiple HE-LTF fields 3320. For example, a midamble 3315 or 3330 may include L-STF, L-LTF, L-SIG, RL-SIG, HE-SIA-A, HE-SIG-B, HE-STF, BPSK Mark1, BPSK Mark2, WUR-Sync, WUR-Data, PE, padding, or the like. The HE-LTF field 3320 or any field included in the midamble 3315 or 3330 may be the same as or different from the HE-LTF field in the preamble or the corresponding field in the preamble.

As described above, a midamble may be used in high mobility scenarios to mitigate high Doppler effects. Depending on the channel condition between STAs, the midamble may be needed or not be needed for all or some of the transmissions. If needed, the number of midambles or the midamble periodicity (or equivalently the number of data OFDM symbols between midambles or between preamble and midamble, i.e., $M_{MA}$) need to be adapted or optimized. Embodiments for midamble adaptation methods are described herein.

Embodiments for capability based midamble transmission are described herein. In one embodiment, a midamble may or may not be a necessary feature, and therefore STAs may indicate such midamble capabilities. STAs may indicate whether they have midamble capability in management/control frames, such as probe request/response, association request/response, beacon frame, or the like. For example, for unicast transmission, a midamble may not be used when one of the STAs does not support the midamble. For multicast/broadcast transmissions, a midamble may not be used for the first transmission if at least one of the STAs in the group does not support the midamble. The multicast/broadcast frame may be transmitted repeatedly. In the retransmissions, a midamble, with different periodicities, may be used as an example.

Embodiments for feedback based midamble transmission are described herein. In one embodiment, a transmitting STA may have the following options for setting up the midamble: no midamble in the PPDU; midamble with high periodicity; or midamble with low periodicity. In one example, STAs may request and respond with midamble preference so that midamble adaptation may be performed at the transmitter side. In one example, midamble request/response may be carried in a control field in a MAC header. Alternatively or additionally, midamble request/response may be carried by modifying HT control field, A-control field, or by adding a EHT/NGV control field.

Figure 34:
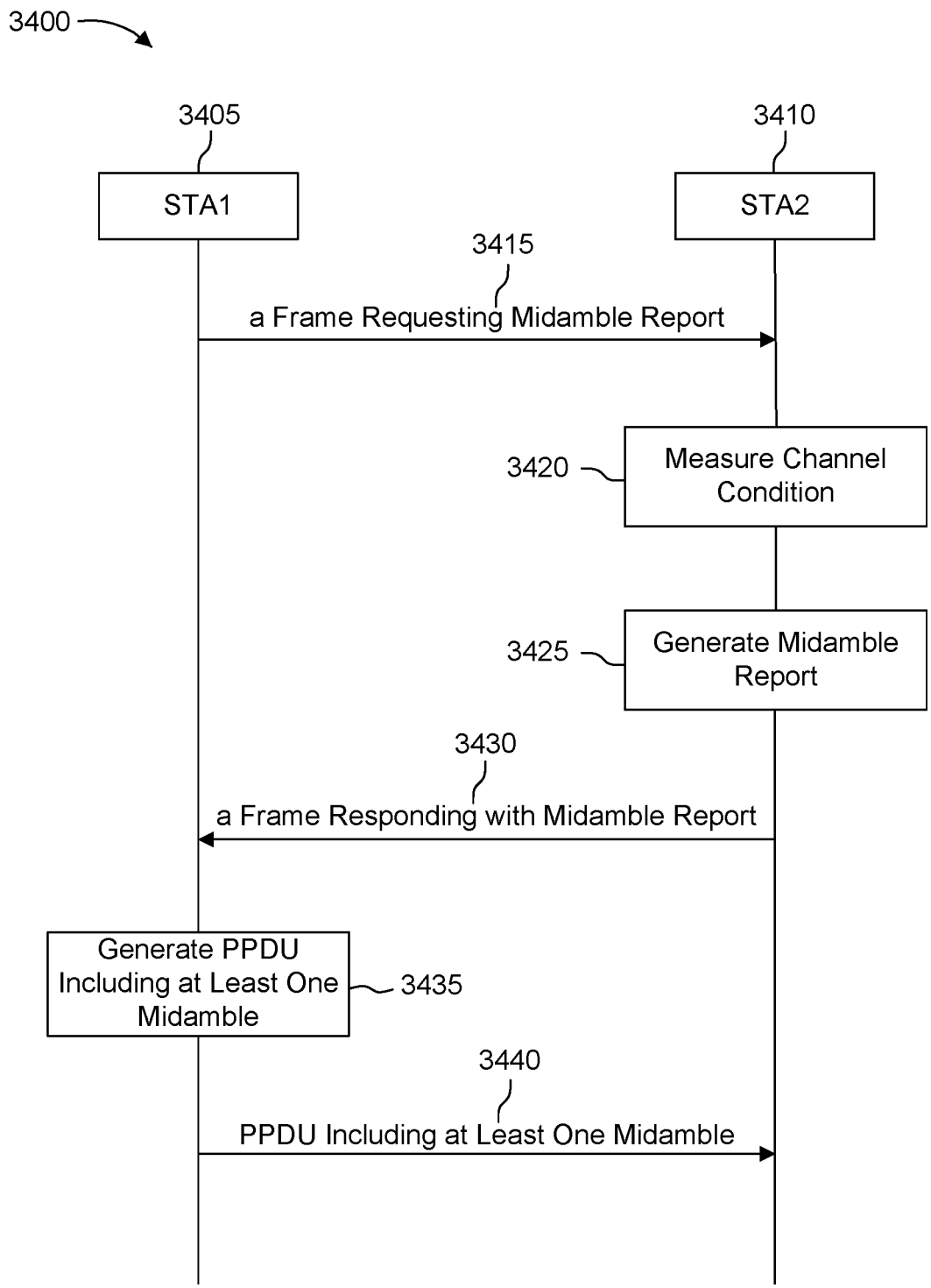
FIG. 34 is a diagram illustrating an example midamble solicited request/response procedure.

FIG. 34 illustrates an example midamble solicited request/response procedure 3400, which may be used in combination of any of other embodiments described herein. As illustrated in FIG. 34, at step 3415, STA1 3405 may transmit, to STA2 3410, a frame 3415 that includes an indicator indicating a request for midamble information (e.g., a midamble report, Doppler measurement, a channel estimation report, or the like). In one example, there may be a HT control field indicating the request in the MAC header of the frame 3415. In another example, A-control field, or a EHT/NGV control field in the frame 3415 may indicate the request. Specifically, in the control field, a midamble request subfield may be set to indicate that midamble or Doppler report may be requested.

STA2 may then detect the frame and notice the request for midamble/Doppler report. At step 3420, STA2 3410 may measure channel condition or Doppler on the frame, for example, by using LTF fields, pilots, guard subcarriers and other long-term parameters saved before. The channel condition or Doppler measurements may be implementation based. At step 3425, STA2 may generate a midamble report or Doppler measurement report. At step 3430, STA2 3430 may then transmit a frame 3430 with the midamble report or Doppler measurement report back to STA1. In the MAC header of the frame 3430, there may be a HT control field, A-control field, or a EHT/NGV control field that includes the midamble information. Specifically, in the control field, Midamble/Doppler feedback/report subfield may be carried. In one embodiment, this subfield may be added to MCS Feedback (MFB) subfield. In another embodiment, this subfield may be standalone. In another embodiment, the Midamble/Doppler feedback/report subfield may be a one-bit field to indicate whether the STA (i.e. STA1 3405 or the requesting STA) may be in mobility or the STA (i.e. STA1 3405 or the requesting STA) may request a midamble transmission. In one embodiment, the Midamble/Doppler feedback/report subfield may be a multi-bit field to indicate the measured Doppler or mobility level. For example, if a 2-bit field may be used, then value 0 may indicate no mobility or Doppler is below a threshold D1. Value 1 may indicate a relatively low mobility or Doppler is between a range [D1, D2]. Value 2 may indicate a relatively high mobility or Doppler is between a range [D2, D3]. Value 3 may indicate a high mobility or Doppler is higher than a threshold D3. In one embodiment, the Midamble/Doppler feedback/report subfield may be a field to indicate the preferred/requested midamble transmission schemes by STA1 3405. For example, STA2 3410 may request a transmission without midamble, or STA2 3410 may request a transmission with midamble and with certain periodicity.

In one embodiment, the midamble report or the Doppler measurement report may include at least one of midamble periodicity, a mobility/Doppler level, midamble frequency, category for a midamble setting, a number of midamble required, the number of OFDM symbols between midambles (or between preamble and midamble), or an indicator indicating whether the first STA need to use a midamble. For example, the midamble periodicity may indicate zero periodicity, low periodicity, medium periodicity, and high periodicity of the at least one midamble located within the data. The zero periodicity of the midamble may indicates that there is no need to use a midamble in the transmitters side (i.e. STA1 3405). The low periodicity of the midamble may indicate that midamble is present every a large number of OFDMA symbols in the data. In other word, the low periodicity may indicate that at least one midamble breaks the data up into a large number of OFDMA symbols. The medium periodicity of the midamble may indicate that midamble is present every medium number of OFDMA symbols. In other words, the medium periodicity may indicate that at least one midamble breaks the data up into a medium number of OFDMA symbols. The high periodicity of the midamble may indicate that midamble is present every a small number of OFDMA symbols. In other words, the high periodicity midamble may indicate that at least one midamble breaks the data up into a small number of OFDMA symbols.

In another embodiment, the mobility/Doppler level may indicate a low mobility/Doppler level, a medium mobility/Doppler level, or a high mobility/Doppler level. The low mobility/Doppler level may indicate that a low number of midambles needs to be used in the transmitting STA (i.e. STA1 3405). The medium mobility/Doppler level may indicate that a medium number of midambles needs to be used in the transmitting STA (i.e. STA1 3405). The high mobility/Doppler level may indicate that a large number of midambles needs to be used in the transmitting STA (i.e. STA1 3405).

In an embodiment, a midamble unsolicited procedure may comprise a STA autonomously report a midamble/Doppler feedback/report by including the subfield in HT control field, A-control field, a EHT/NGV control field or the like. The STA may need to use a set of parameters to indicate the frame used for Doppler measurement. For example, the set of parameters include, but are not limited to, GID, Coding Type, STBC, FB Tx type, or the like.

For broadcast/multicast transmissions, midamble adaptation procedures may be more complex. Embodiments for negative acknowledgement (NAK)-based midamble adaptation procedure are described herein. NAK feedback with broadcast/multicast transmissions is also described. First, an AP may transmit a broadcast/multicast PPDU with PHY header and data packet body to multiple STAs. In the PHY header, one or more of the following information may be carried: broadcast/multicast indication; broadcast/multicast feedback indication; and AP ID. The broadcast/multicast indication field may indicate that the PPDU may carry a broadcast/multicast frame. The broadcast/multicast feedback indication field may indicate that broadcast/multicast NAK feedback may be requested. In one embodiment, the NAK feedback may be transmitted xIFS time after the end of the PPDU. A STA that successfully detects the PHY header but fails to detect the data packet may prepare the NAK transmission to the AP accordingly. In the AP ID field, BSSID, BSS color, or other type of ID may be carried in the PHY header. The STA which may be associated with the AP may be able to transmit the NAK back to the AP.

Second, the STA that successfully detects the PHY header but fails to detect the data packet may prepare a NAK transmission. The STA may fulfill one or more of the following requirements to transmit the NAK: (1) the STA may associate with the AP; and/or (2) the STA may be an intended receiver of the broadcast/multicast transmission.

Third, the STA may transmit a NAK xIFS time after the end of the PPDU. The NAK transmission may be a null data packet (NDP) transmission which may not carry a MAC body. In one embodiment, the STA may not include its address in the NAK transmission. In another embodiment, the STA may use a subset of subcarriers or all the subcarriers to carry a predefined sequence to indicate that the STA did not detect the broadcast/multicast frame correctly. The predefined sequence may be an AP specific sequence, a BSS color specific sequence or the like. By the detection of the sequence, the AP may know that it may be the receiver of the NAK transmission. The NAK transmission may also be transmitted in a FDMA fashion. For example, several non-overlapping resource units (RUs) may be defined in frequency domain. STAs with NAK may choose one RU to transmit a sequence to signal NAK. The AP may perform packet detection xIFS time after the broadcast/multicast frame transmission. The AP may detect the NAK sequences on one or more RUs. The AP may count the number of RUs with NAK (i.e., N_NAK) and notice that at least N_NAK STAs fail to detect the broadcast/multicast frame. If N_NAK is greater than a threshold, retransmission or later broadcast/multicast transmission may use a midamble. For example, if too many resources are used to transmit NAKs by STAs, the AP may determine that the STAs have some issue in receiving its broadcast/multicast transmission and may generate a midamble to use in its broadcast/multicast transmissions. The AP may also adjust, based on the received NAKs, a midamble, a midamble frequency, the number of midambles to use, MCS, or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a first station (STA), the method comprising:
   transmitting, to a second STA, a request frame that includes an indicator indicating a request for midamble information;
   receiving, from the second STA, a response frame that includes the midamble information indicating one or more channel conditions based on the request frame; and
   transmitting a physical layer convergence procedure (PLCP) protocol data unit (PPDU) that includes at least one midamble generated based on the midamble information.

2. The method of claim 1, wherein the midamble information includes a midamble report or a Doppler measurement report.

3. The method of claim 2, wherein the midamble report or the Doppler measurement report includes at least one of a midamble periodicity, a mobility/Doppler level, a midamble frequency, a category for a midamble setting, a number of midamble required, or an indicator indicating whether the first STA needs to use a midamble.

4. The method of claim 3, wherein the midamble periodicity indicates zero periodicity, low periodicity, medium periodicity, or high periodicity of the at least one midamble located within a data portion of the PPDU, and wherein the low periodicity indicates the midamble periodicity to be higher relative to the zero periodicity and lower relative to medium periodicity, the medium periodicity indicates the midamble periodicity to be higher relative to the low periodicity and lower relative to high periodicity, and the high periodicity indicates the midamble periodicity to be higher relative to the to medium periodicity.

5. The method of claim 4, wherein the zero periodicity of the at least one midamble indicates that there is no need to use a midamble.

6. The method of claim 4, wherein the low periodicity, the medium periodicity, or the high periodicity of the at least one midamble indicates a periodicity being associated with a number of OFDMA symbols based on the at least one midamble located within the data portion of the PPDU.

7. The method of claim 4, wherein the mobility/Doppler level indicates a low mobility/Doppler level, a medium mobility/Doppler level, or a high mobility/Doppler level.

8. The method of claim 1, wherein the at least one midamble is within a data portion of the PPDU, and wherein the at least one midamble includes channel estimation information.

9. A first station (STA) comprising:
   a receiver; and
   a transmitter,
   the transmitter configured to transmit, to a second STA, a request frame that includes an indicator indicating a request for midamble information;
   the receiver configured to receive, from the second STA, a response frame that includes the midamble information indicating one or more channel conditions based on the request frame; and
   the transmitter configured to transmit a physical layer convergence procedure (PLCP) protocol data unit (PPDU) that includes at least one midamble generated based on the midamble information.

10. The first STA of claim 9, wherein the midamble information includes a midamble report or a Doppler measurement report.

11. The first STA of claim 10, wherein the midamble report or the Doppler measurement report includes at least one of a midamble periodicity, a mobility/Doppler level, a midamble frequency, a category for a midamble setting, a number of midamble required, or an indicator indicating whether the first STA needs to use a midamble.

12. The first STA of claim 11, wherein the midamble periodicity indicates zero periodicity, low periodicity, medium periodicity, or high periodicity of the at least one midamble located within a data portion of the PPDU, and wherein the low periodicity indicates the midamble periodicity to be higher relative to the zero periodicity and lower relative to medium periodicity, the medium periodicity indicates the midamble periodicity to be higher relative to the low periodicity and lower relative to high periodicity, and the high periodicity indicates the midamble periodicity to be higher relative to the to medium periodicity.

13. The first STA of claim 12, wherein the zero periodicity of the at least one midamble indicates that there is no need to use a midamble.

14. The first STA of claim 12, wherein the low periodicity, the medium periodicity, or the high periodicity of the at least one midamble indicates a periodicity being associated with a number of OFDMA symbols based on the at least one midamble located within the data portion of the PPDU.

15. The first STA of claim 12, wherein the mobility/Doppler level indicates a low mobility/Doppler level, a medium mobility/Doppler level, or a high mobility/Doppler level.

16. The first STA of claim 9, wherein the at least one midamble is within a data portion of the PPDU, and wherein the at least one midamble includes channel estimation information.

* * * * *